United States Patent
Sakuma et al.

(10) Patent No.: US 7,624,043 B2
(45) Date of Patent: Nov. 24, 2009

(54) INVENTORY CONTROL SYSTEM AND METHOD IN RECYCLE-ORIENTED SOCIETY

(75) Inventors: Toshiyuki Sakuma, Kawasaki (JP); Mitsuhiro Enomoto, Kamakura (JP); Yuzo Hiroshige, Tokyo (JP); Kunio Kumamoto, Yokohama (JP); Hideyuki Sasaki, Fujissawa (JP); Masayasu Uozaki, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 915 days.

(21) Appl. No.: 10/769,311

(22) Filed: Jan. 30, 2004

(65) Prior Publication Data

US 2004/0254841 A1 Dec. 16, 2004

(30) Foreign Application Priority Data

Apr. 28, 2003 (JP) .............................. 2003-123145

(51) Int. Cl.
G06Q 1/14 (2006.01)
G06Q 20/00 (2006.01)

(52) U.S. Cl. ............................ 705/22; 705/8; 705/29; 29/426.1

(58) Field of Classification Search ................. None
See application file for complete search history.

(56) References Cited

U.S. PATENT DOCUMENTS

| | | | |
|---|---|---|---|
| 5,128,861 A * | 7/1992 | Kagami et al. | 705/10 |
| 5,914,878 A * | 6/1999 | Yamamoto et al. | 700/106 |
| 5,983,198 A * | 11/1999 | Mowery et al. | 705/22 |
| 6,560,508 B1 * | 5/2003 | Radican | 700/214 |
| 2001/0047578 A1 * | 12/2001 | Maruyama et al. | 29/426.1 |
| 2002/0028080 A1 * | 3/2002 | Naito et al. | 399/12 |
| 2002/0069137 A1 * | 6/2002 | Hiroshige et al. | 705/27 |
| 2002/0103690 A1 * | 8/2002 | Lyon et al. | 705/9 |
| 2002/0138319 A1 * | 9/2002 | Kaburagi et al. | 705/7 |
| 2003/0145010 A1 * | 7/2003 | Chiu et al. | 707/100 |

FOREIGN PATENT DOCUMENTS

| | | |
|---|---|---|
| JP | 11-120255 | 4/1999 |
| JP | 2002-342453 A | 11/2000 |
| JP | 2002-150083 A | 5/2002 |

OTHER PUBLICATIONS

Japan Patent Office (JPO) for patent application JP2003-123145 (Mar. 4, 2008).

* cited by examiner

*Primary Examiner*—F. Zeender
*Assistant Examiner*—Luna Champagne
(74) *Attorney, Agent, or Firm*—Townsend and Townsend and Crew LLP

(57) ABSTRACT

In a physical distribution model of the circulation type, synchronization is established between a reuse plan and a delivery/fabrication plan to thereby reasonably reduce the excess and deficiency of inventory articles at a confluence point of regenerated reusable articles and newly delivered component parts. With regard to newly delivered lower-level items, predict a variation or fluctuation of stock quantity based on at least a delivery schedule of them and a present stock amount along with usage plans in manufacturing processes. As for lower-level items of regenerated articles, predict a delivery due date and an expected number of such regenerated lower-level items based on at least a stock quantity of recovered items collected for reuse purposes and a lead time for taking regenerated lower-level items out of the collected items, thereby controlling, based on the both prediction results, the stock quantity of the lower-level items in manufacturing processes.

2 Claims, 25 Drawing Sheets

FIG.3
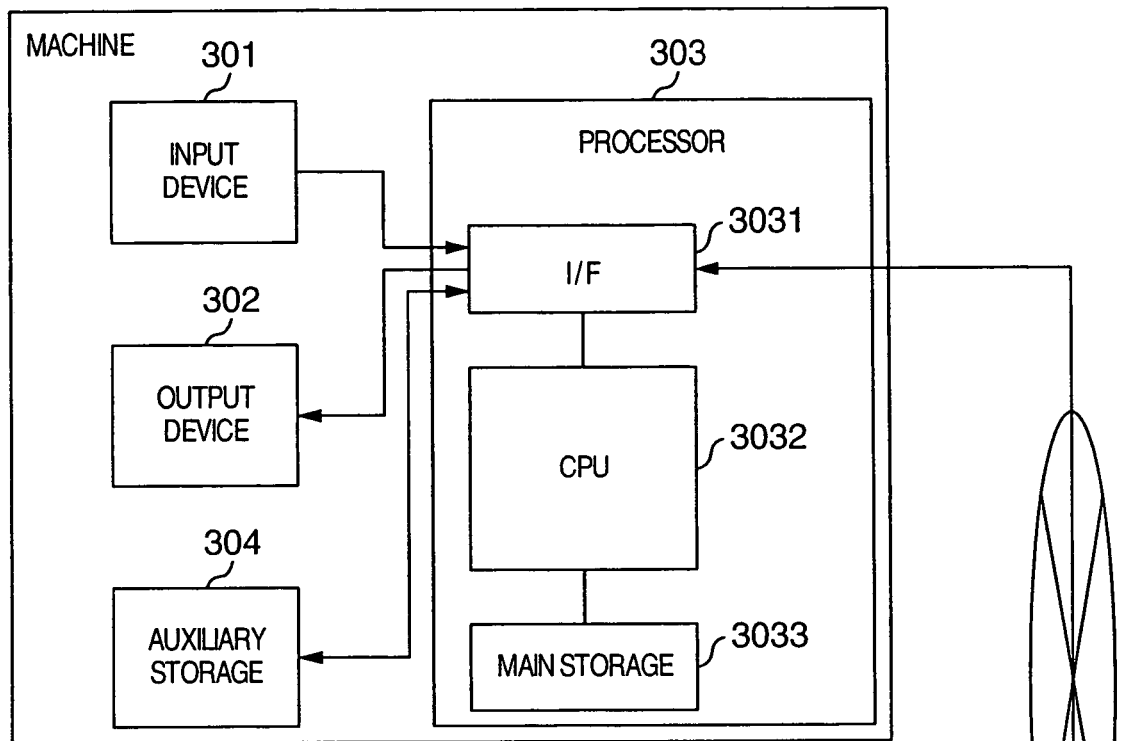
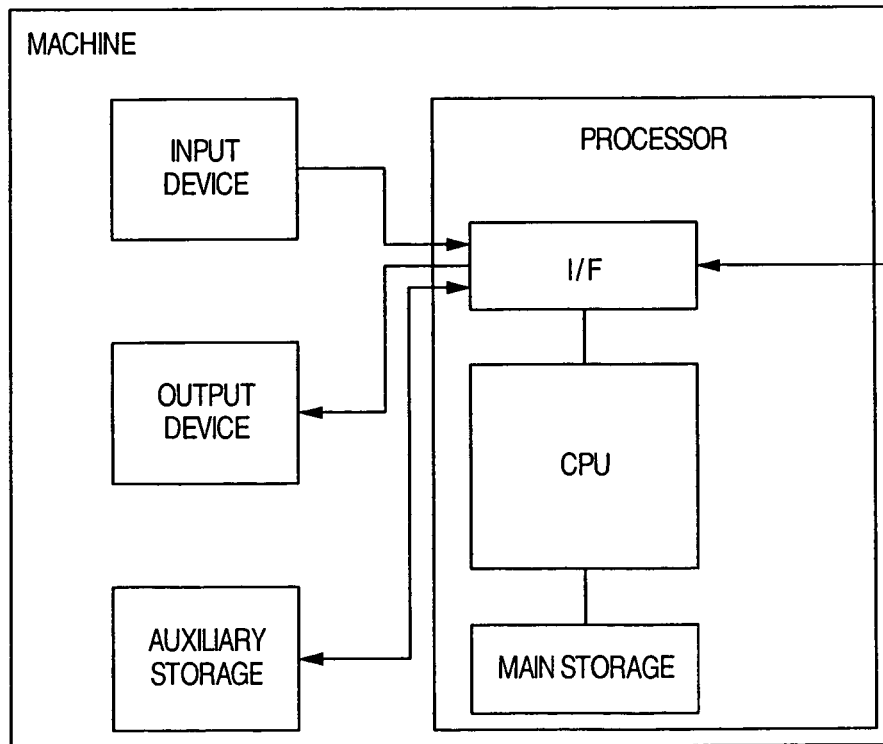

● ITEM TREE CODE

| UPPER ITEM | LOWER ITEM | UPPER ITEM NUMBER | ... |
|---|---|---|---|
| X | a | 1 | |
| X | $X_1$ | 1 | |
| $X_1$ | b | 1 | |
| $X_1$ | $X_2$ | 1 | |
| $X_2$ | c | 3 | |
| ... | | | |

● POINT CODES

| SOURCE | TARGET | LEAD TIME (DAY) | ITEM | LOT SIZE | UNIT | ... |
|---|---|---|---|---|---|---|
| α | β | 1 | X | 20 | PCS | |
| β | γ | 1 | a | 1 | PCS | |
| β | γ | 1 | b | 1 | PCS | |
| β | γ | 1 | c | 1 | PCS | |
| ... | | | | | | |

● PROCESS CODES

| POINT | REGENERATION CONTENTS | LEAD TIME (DAY) | ... |
|---|---|---|---|
| β | ITEM X → (PROCESS A) → ITEM $a_0$, $X_1$ | 1 | |
| β | ITEM $a_0$ → (PROCESS D) → ITEM a | 1 | |
| β | ITEM $X_1$ → (PROCESS B) → ITEM $b_0$, $X_2$ | 1 | |
| β | ITEM $b_0$ → (PROCESS E) → ITEM b | 1 | |
| β | ITEM $X_2$ → (PROCESS C) → ITEM $c_0$, $X_3$ | 1 | |
| β | ITEM $c_0$ → (PROCESS F) → ITEM c | 1 | |
| ... | | | |

● POINT CODES

| SOURCE | TARGET | LEAD TIME (DAY) | ITEM | LOT SIZE | UNIT | ... |
|---|---|---|---|---|---|---|
| δ | γ | 1 | a | 10 | PCS | |
| δ | γ | 1 | b | 20 | PCS | |
| δ | γ | 1 | c | 30 | PCS | |
| ... | | | | | | |

● STOCK CAPACITY CODES

| ITEM | STOCK CAPACITY | UNIT | ... |
|---|---|---|---|
| a | 100 | PCS | |
| b | 200 | PCS | |
| c | 300 | PCS | |
| ... | | | |

● ALARM CAPACITY CODES

| ITEM | STOCK CAPACITY | UNIT | ... |
|---|---|---|---|
| a | 10 | PCS | |
| b | 100 | PCS | |
| c | 30 | PCS | |
| ... | | | |

FIG.16A

● STOCK DATA (POINT $\alpha$)      DATE: 4/1

| POINT | ITEM | STOCK QUANTITY | UNIT | ... |
|---|---|---|---|---|
| $\alpha$ | X | 25 | PCS | |
| $\alpha$ | Y | 20 | PCS | |
| $\alpha$ | Z | 30 | PCS | |
| ... | | | | |

FIG.16B

● STOCK DATA (POINT $\beta$)      DATE: 4/1

| POINT | ITEM | STOCK QUANTITY | UNIT | ... |
|---|---|---|---|---|
| $\beta$ | X | 0 | PCS | |
| $\beta$ | $X_1$ | 0 | PCS | |
| $\beta$ | $a_0$ | 0 | PCS | |
| $\beta$ | a | 0 | PCS | |
| $\beta$ | $a_X$ | 0 | PCS | |
| $\beta$ | $X_2$ | 25 | PCS | |
| $\beta$ | $b_0$ | 0 | PCS | |
| $\beta$ | b | 0 | PCS | |
| $\beta$ | $b_X$ | 0 | PCS | |
| $\beta$ | $X_3$ | 0 | PCS | |
| $\beta$ | $c_0$ | 0 | PCS | |
| $\beta$ | c | 0 | PCS | |
| $\beta$ | $c_X$ | 0 | PCS | |
| ... | | | | |

FIG.17A

● STOCK DATA (POINT γ)　　　　　　　　　　　　　　　　　　　　　　　　DATE : 4/1

| POINT | ITEM | STOCK QUANTITY | UNIT | ... |
|---|---|---|---|---|
| γ | a | 95 | PCS | |
| γ | b | 200 | PCS | |
| γ | c | 300 | PCS | |
| ... | | | | |

FIG.17B

● STOCK DATA (POINT δ)　　　　　　　　　　　　　　　　　　　　　　　　DATE : 4/1

| POINT | ITEM | STOCK QUANTITY | UNIT | ... |
|---|---|---|---|---|
| δ | a | 10 | PCS | |
| δ | b | 0 | PCS | |
| δ | c | 30 | PCS | |
| ... | | | | |

FIG.18

● CONSUMPTION PREDICT DATA STORAGE UNIT　　　　　　　　　　　　　　DATE : 4/1

| ITEM | 4/1 | 4/2 | 4/3 | 4/4 | 4/5 | 4/6 | ... |
|---|---|---|---|---|---|---|---|
| a | 0 | 4 | 5 | 6 | 5 | 3 | |
| b | 0 | 50 | 10 | 30 | 30 | 10 | |
| c | 0 | 0 | 0 | 0 | 0 | 1 | |
| ... | | | | | | | |

FIG.19A

● OVER / SHORT AMOUNT (DATE: 3/31)

| ITEM | ... | 4/1 | ... | 4/4 | 4/5 | 4/6 | ... |
|---|---|---|---|---|---|---|---|
| a | | 0 | | ▲20 | ▲25 | ▲28 | |
| b | | 0 | | ▲40 | ▲70 | ▲80 | |
| c | | 0 | | 0 | 0 | ▲1 | |
| ... | | | | | | | |

CLICK (on row a) → TO FIG.20

CLOSE

FIG.19B

● OVER / SHORT AMOUNT (DATE: 4/1)

| ITEM | ... | 4/1 | ... | 4/4 | 4/5 | 4/6 | ... |
|---|---|---|---|---|---|---|---|
| a | | 0 | | ▲20 | 0 | ▲3 | |
| b | | 0 | | ▲90 | ▲120 | ▲105 | |
| c | | 0 | | 0 | 0 | ▲1 | |
| ... | | | | | | | |

CLICK (on row a) → TO FIG.25

CLICK → TO FIG.26

CLOSE

FIG.23

● STOCK DATA (POINT α)          DATE: 4/1

| POINT | ITEM | STOCK QUANTITY | UNIT | ... | ... |
|---|---|---|---|---|---|
| α | X | 25 | PCS | | |
| α | Y | 20 | PCS | | |
| α | Z | 30 | PCS | | |
| ... | | | | | |

↓

● DELIVERY JUDGE          DATE: 4/1

| POINT | ITEM | STOCK QUANTITY | UNIT | ... | LOT SIZE | ... |
|---|---|---|---|---|---|---|
| α | X | 25 | PCS | | 20 | |
| α | Y | 20 | PCS | | 30 | |
| α | Z | 30 | PCS | | 50 | |
| ... | | | | | | |

↓

● ITEM DEPLOY          DATE: 4/1

| POINT | ITEM | STOCK QUANTITY | UNIT | ... | LOT SIZE | ... |
|---|---|---|---|---|---|---|
| α | a | 25 | PCS | | 20 | |
| α | b | 25 | PCS | | 20 | |
| α | c | 75 | PCS | | 20 | |
| ... | | | | | | |

↓

● DELIVERY PREDICT          DATE: 4/1

| POINT | ITEM | STOCK QUANTITY | UNIT | ... | LOT SIZE | DELIVERY PREDICT | ... |
|---|---|---|---|---|---|---|---|
| α | a | 25 | PCS | | 20 | 4/5 | |
| α | b | 25 | PCS | | 20 | 4/6 | |
| α | c | 75 | PCS | | 20 | 4/7 | |
| ... | | | | | | | |

INVENTORY CONTROL SYSTEM AND METHOD IN RECYCLE-ORIENTED SOCIETY

BACKGROUND OF THE INVENTION

The present invention relates generally to inventory control architectures, and more particularly, to recycle-supported inventory control systems and methods for integrally managing reusable component parts as taken out of the life cycle-terminated products and new articles purchased from suppliers to thereby control stock quantities thereof. This invention also relates to recording media for storage of an inventory control program(s).

As people's concerns in environments and recycle systems are increasing year by year, an environmental problem becomes an important issue to be handled by an entirety of society. In this social trend, in order to lessen loads to environments, a manufacturing company high in environmental consciousness is attempting to establish an industrial production system of the circulation type, which permits recovery or "salvage" of used products for recycle purposes rather than mere abolishment or scrapping thereof.

One prior art inventory management scheme in a physical distribution model for performing production of the circulation type has been disclosed in JP-A-11-120255. Firstly, with respect to commercial articles under inventory management, a shipment quantity of such articles is predicted based on shipment records in the past. In addition, a recovery quantity of the articles for sale is predicted based on either their recovery records or shipment records in the past. And a variation or fluctuation of the stock quantity of such articles is predicted based on inventory variation factors in addition to the shipment quantity and a prediction result of recovery quantity. Then, based on an inventory variation factor prediction result obtained in this way, determine the content of a inventory adjustment instruction.

The above-stated prior art is an inventory management technique in a physical distribution model of the so-called commercial article reciprocation type, which causes articles for sale to circulate while keeping their native forms without any form changes. However, in the currently distributed products in the marketplace, there are many products which do not reciprocate while keeping their forms unchanged but are to be reused after having disassembled into component parts or materials after collection for recovery and then subjected to regeneration or "rebirth" processing. In view of this, it has been required to establish an inventory management architecture in the circulation type physical distribution model which takes account of up to such the disassembly and reuse processes.

In an inventory management technology in the circulation type physical distribution model that also takes account of the disassembly and reuse processes, in order to further reduce the loads to environments, a need is felt to consider the following points: reusing a maximized number of component parts of a product collected for recovery; eliminating any futile works in the absence of reusability; delivering a promised product to a market or a customer exactly on a due date in a conventional way; and, minimizing costs for disassembly, regeneration and production or fabrication processes.

SUMMARY OF THE INVENTION

The present invention is to provide, in the circulation type physical distribution model which disassembles a collected and recovered product into component parts and materials and then performs regeneration processing to thereby utilize them for production, an inventory control system, an inventory control method and an inventory control program, which can rationally reduce any possible excess and deficiency of an inventory at a confluence point of regenerated articles and newly delivered articles while achieving synchronization between a regeneration plan and procurement/fabrication plans. This invention also provides a recording medium which stores the inventory control program.

To attain the foregoing object, an inventory control system with recycle supportability of this invention employs an inventory control method for controlling a stock quantity of lower-level items used for production of items (products) in manufacturing processes thereof, which is arranged to predict, regarding lower-level items to be newly procured, a variation in stock quantity of the new lower-level items at least based on a delivery schedule of the new lower-level items and a present stock quantity along with a usage schedule in a production process. Regarding lower-level items of regenerated articles obtained from use-completed items collected for recovery, predict an expected delivery date and an expected number of the regenerated lower-level items based on at least a stock quantity of recovered items and a lead time for taking a regenerated lower-level item out of the items thus recovered. Then, control the stock quantity of lower-level items in manufacturing processes based on a stock prediction result of the new lower-level items and a delivery prediction result of the regenerated lower-level items.

The recycle inventory control system of the invention gets started in a predetermined cycle whereby a program for execution of said each processing and various kinds of data are read out of a storage means into a processing apparatus so that every kind of calculation processing is executed for more than one time.

Other objects, features and advantages of the invention will become apparent from the following description of the embodiments of the invention taken in conjunction with the accompanying drawings.

BRIEF DESCRIPTION OF THE DRAWINGS

FIG. 3 is a diagram showing a hardware configuration of one embodiment of the invention.

FIGS. 16A and 16B are diagrams each showing a table structure of inventory data.

FIGS. 17A-17B are diagrams showing a table structure of inventory data.

FIG. 18 is a diagram each showing a table structure of consumption prediction data.

FIGS. 19A and 19B are diagrams showing display examples of an initial screen.

FIG. 23 is a diagram explaining delivery prediction processing of recovered articles collected for recycle use.

DETAILED DESCRIPTION OF THE INVENTION

Embodiments of the present invention will be explained with reference to the accompanying drawings below.

A physical distribution model which is supposed to be employed by an inventory control system with recycle supportability of one embodiment of this invention is a physical distribution model of the circulation type. The circulation type physical distribution model as used herein refers to a physical distribution model which permits at least portions of a manufactured and shipped product to be collected after the usage thereof and then disassembled into components parts or materials and next subjected to regeneration or "rebirth" processing and thereafter reused at the time of mass-production of new products for shipments.

Additionally in the explanation below, the language "item" will be used. This word "item" will be used as a generic term of products, component parts, half-finished products, products in process, raw materials—these are equivalent to physical things—or other similar ones and also used to represent any one of them. For example, for a product, a component making up such product is represented by a lower-level item (component) of a given item (product).

An explanation will first be given of the physical distribution model incorporating the recycle inventory control system of one embodiment of the invention.

(1) Physical Distribution Model

Figure 1:
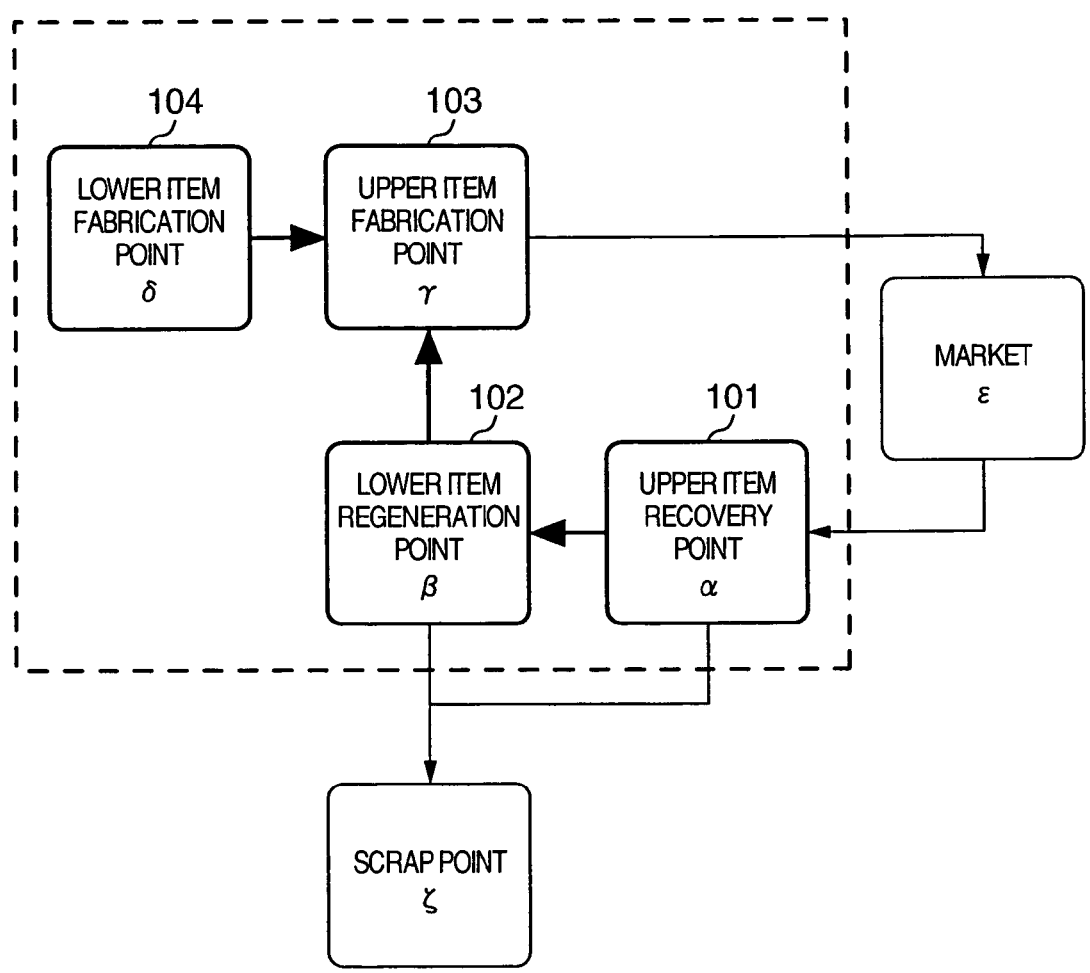
FIG. 1 is a diagram for explanation of a physical distribution model applying one embodiment of the present invention.

FIG. 1 is a diagram for explanation of a physical distribution model with one embodiment of the invention applied thereto.

A flow of items (things) is constituted from three flows which follow.

The first one is a flow of an ordinary supply chain. This is a flow in which a lower-level item that was newly supplied from a lower-level item fabrication base point δ 104 is delivered to an upper-level item fabrication point γ 103, wherein products are manufactured at the fabrication point γ 103 and then exposed for sale in a marketplace ε.

The second one is a flow of recycle chain. This is a flow in which usage-completed and recovered products are collected together at an upper-level item recovery point α 101 and then regenerated at a lower-level item regeneration point β 102 when the need arises, wherein resultant regenerated lower-level items are delivered as regenerated articles for recycle use toward the upper-level item fabrication point γ 103.

And the last one is a flow for scrapping any useless items that are not recyclable. In this flow, such items flow from the recovery point α 101 and regeneration point β 102 toward a scrap point ξ.

(2) System Configuration

An explanation will next be given of a system configuration of the recycle-supportable inventory control system of one embodiment of this invention.

Figure 2:
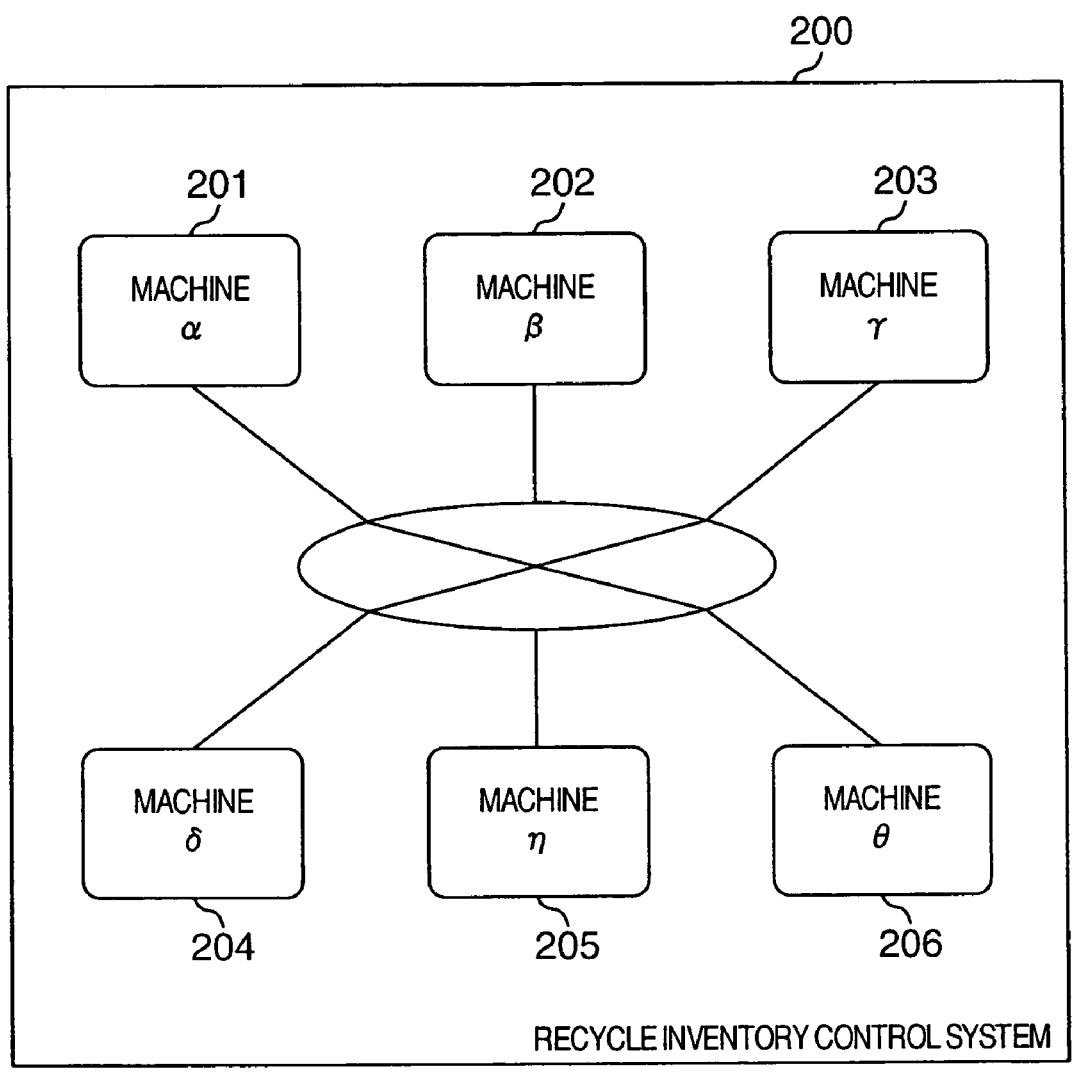
FIG. 2 is a diagram explaining a system configuration of one embodiment of this invention.

FIG. 2 is a diagram for explanation of the system configuration of the recycle inventory control system in one embodiment of the invention.

The recycle inventory control system 200 in this embodiment is constructed from a plurality of machines which are connected together through a network, wherein various kinds of functions are processed in a distributed fashion at a subsystem(s) via the network.

In FIG. 2, a machine α 201 is an information processing machine which provides management of information such as a stock status of the upper-level item recovery point α 101. A machine β 202 is an information processing machine which manages information such as a stock status of the lower-level item regeneration point β 102. A machine γ 203 is an information processing machine for management of information such as a stock status of the upper-level item fabrication point γ 103. A machine δ is an information processing machine for management of information such as a stock status of lower-level item fabrication point δ 104. A machine η is an information processing machine which provides integrated management of the other machines. A machine θ is an information processor machine which computes consumption prediction and manages such the information.

Note here that the recycle inventory control system in accordance with the invention should not be limited only to the form which achieves distributed processing among respective machines as in this embodiment and may alternatively be realized by a form which enables a single machine to perform concentrated processing. Optionally, the same may be realized by partly reorganizing the functions of respective machines to be explained later, by subdividing the functions or by combining a function with others. In addition, although in this embodiment an explanation is given under an assumption that the recycle inventory control system is designed as a system to be established independently, this invention should not be limited thereto. This invention can also be built in other information processing systems to function as part of them. It is also considered that the invention is implemented in a form that a group of software programs which causes a computer to execute the contents to be later described are stored in a computer-readable recording medium.

(3) Hardware Structure

An explanation will next be given of a hardware structure in the recycle inventory control system of one embodiment of this invention.

FIG. 3 is a diagram showing a hardware arrangement of one embodiment of the invention.

Each machine with the network configuration depicted in FIG. 2 has an input device 301 such as a keyboard or a pointing device called the "mouse," an output device 302 such as a display, an auxiliary storage device 304, and a processing device 303 which executes an inventory control program. The processing device 303 is equipped with an interface 3031, a central processor unit (CPU) 3032, and a main storage or memory device 3033, which is interconnected via the interface 3031 to the input device 301, output device 302 and auxiliary storage device 304.

In this embodiment a processing result of the inventory control program is stored in a storage area that is defined in the main storage device 3033. The program is previously held in the auxiliary storage device, wherein a task is realized in such a way that the CPU 3032 executes the one that is read into the main storage device 3033.

It should be noted that although in this embodiment an explanation is given while taking an example a specific case where the recycle inventory control system is realized by a combination of general-purpose information processing apparatus and software, the system may be realized by a hardware equipment including hard-wired logic units or alternatively by a combination of such hardware and a preprogrammed general-purpose information processing apparatus.

(4) Functions of Recycle Inventory Control System

An explanation will next be given of the function of each of the machines which make up the recycle inventory control system.

As for the function of each machine making up the recycle inventory control system, an explanation will be given with reference to FIGS. 4 to 9.

First, functions equipped by the machine α of the upper-level item recovery point α 101 will be explained.

Figure 4:
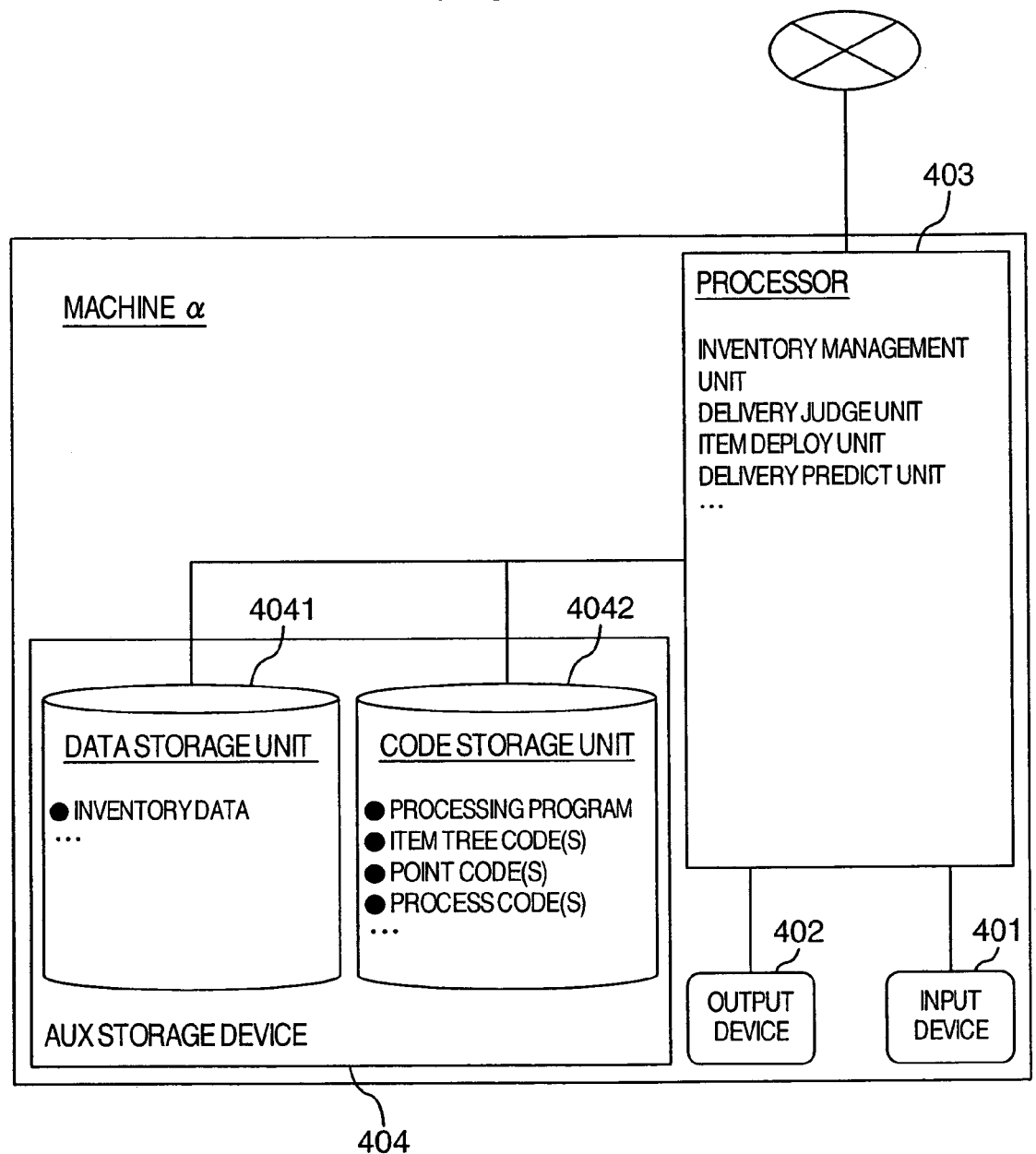
FIG. 4 is a diagram for explanation of functions of a machine α.

The functions of machine α are shown in FIG. 4.

The machine α is an information processing machine which provides management of information such as a stock status of upper-level item recovery point α 101. At a processing device 403 of machine α, this performs processing tasks such as inventory management, delivery judgment, item deployment, delivery prediction and the like.

As those functions included in the inventory management, there are an incoming merchandise registration function, shipment registration function, stock calculation function, stock registration function, stock information read-in function and others. The delivery judgment involves a deliverable item judgment function. The item deployment includes a lower-level item deployment function. The delivery prediction includes, but not limited to, a delivery schedule calculation function, delivery schedule registration function, delivery schedule read function, and delivery schedule correction function.

In the auxiliary storage device 404, there are a data storage unit 4041 and a code storage unit 4042. The data storage unit 4041 is a storage region for retaining therein certain data, such as incoming merchandise data of articles returned and collected from the marketplace, shipment data transferred to the regeneration point, stock data of the recovery point α 101, and delivery schedule data. The code storage unit 4042 is a storage area for storing the processing programs of various kinds of functions, item tree codes, base-point codes, regeneration process code and others.

An explanation will next be given of the functions offered by the machine β of the lower-level item regeneration base point β 102.

Figure 5:
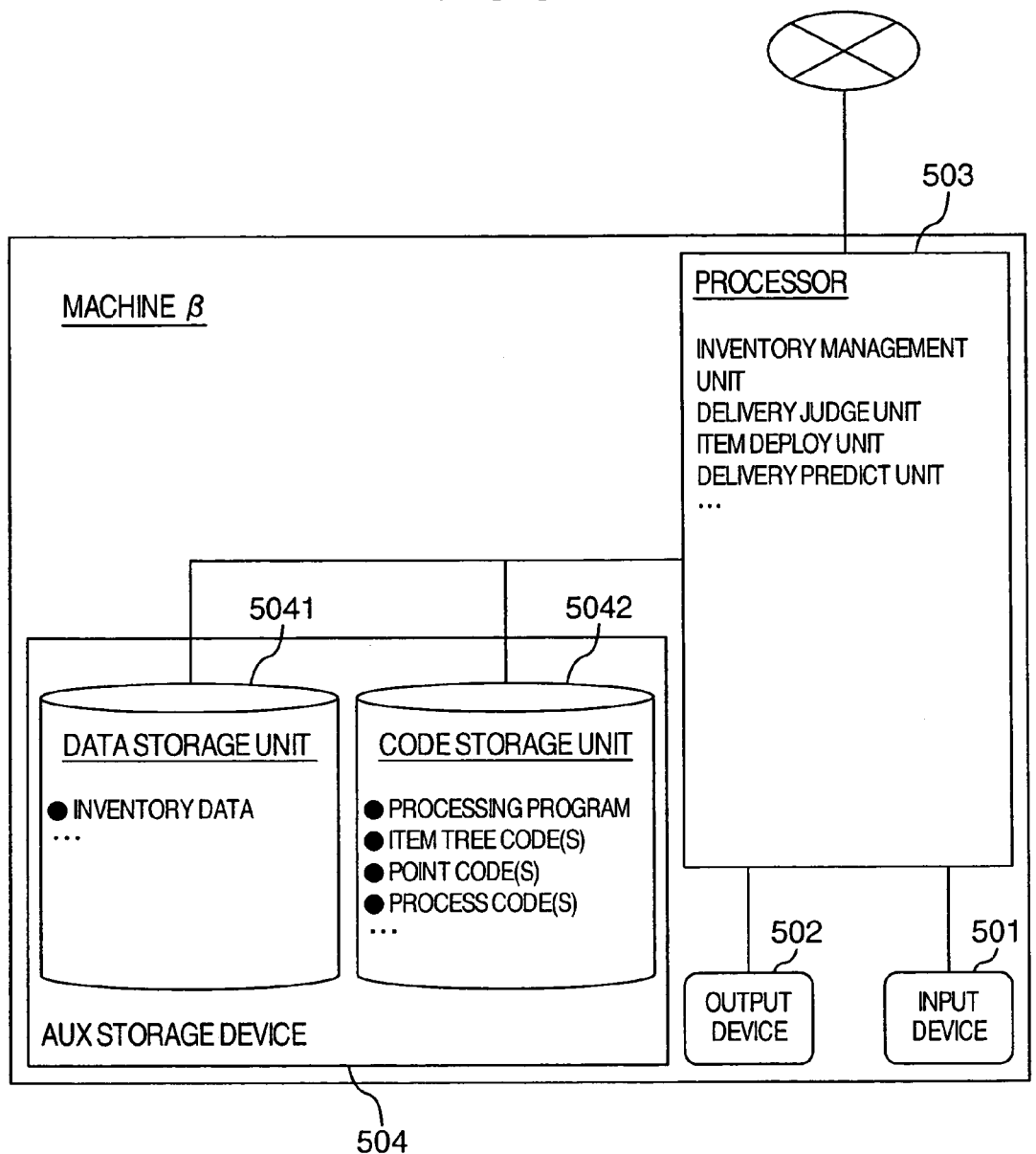
FIG. 5 is a diagram explaining functions of a machine β.

The functions of machine β are shown in FIG. 5.

In a processing device 503 of the machine β, processing tasks such as inventory management, delivery judgment, item deployment, delivery prediction or equivalents thereto are performed. Similar functions to those of the machine α are included in respective processings.

An auxiliary storage device 504 of the machine β also is configured from a data storage unit 5041 and a code storage unit 5042. Retained in the data storage unit 5041 are incoming merchandise data of recovered articles as transferred from the recovery point α 101, shipment data of articles shipped to the fabrication point γ 103, stock data of the regeneration point β 102, data of delivery schedule to the fabrication point γ 103 and so forth. Let the code storage unit 5042 store processing programs of various kinds of functions, item tree codes, base-point codes, regeneration process code and others.

An explanation will next be given of functions built in the machine γ of the upper-level item fabrication point γ 103.

Figure 6:
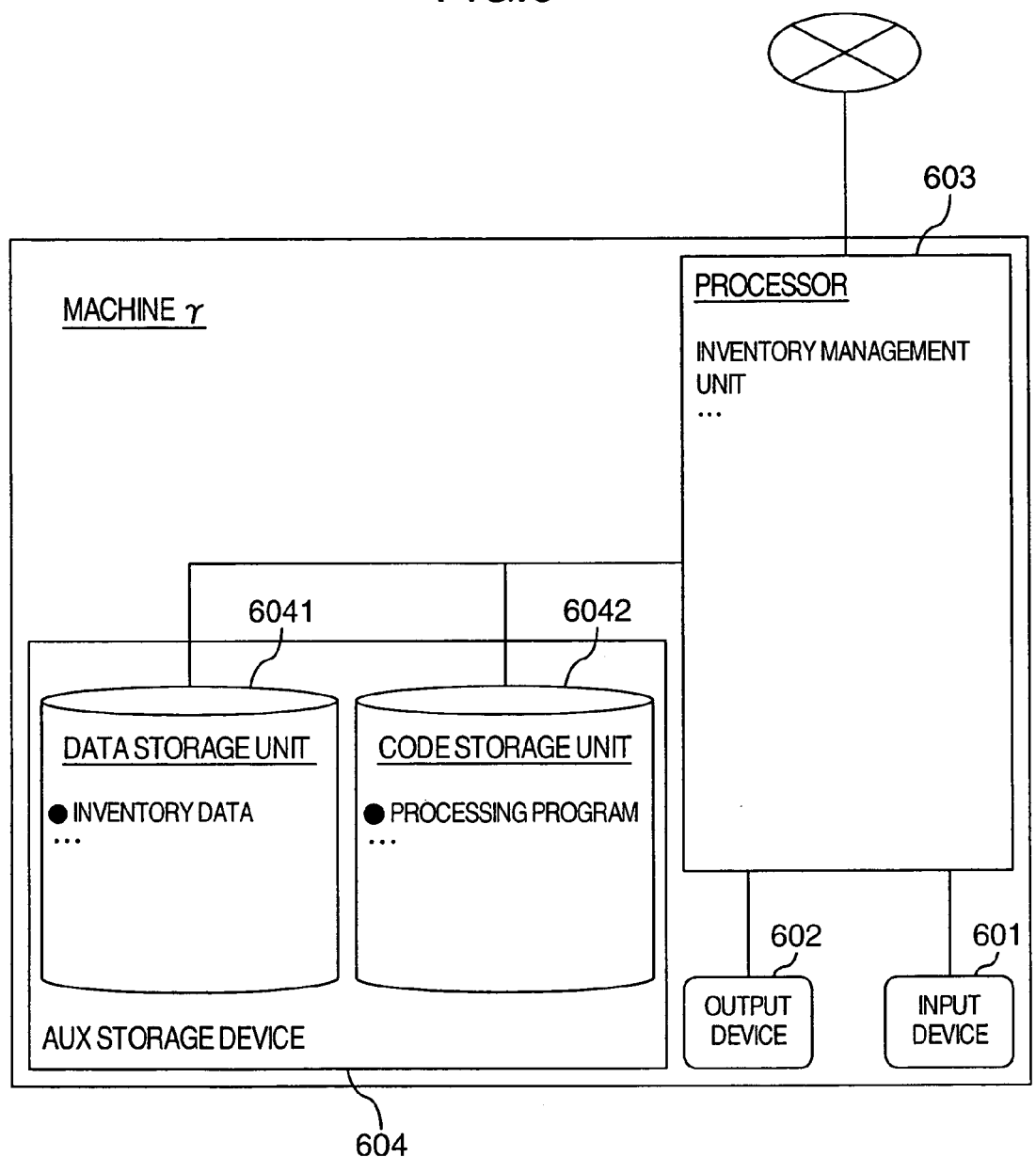
FIG. 6 is a diagram showing functions of a machine γ.

The functions of machine γ are shown in FIG. 6.

A processing device 603 of the machine γ performs inventory management processing. Functions involved in this inventory management processing are an incoming merchandise registration function, consumption registration function, stock calculation function, stock registration function, stock information read function, etc.

An auxiliary storage device 604 of the machine γ also is comprised of a data storage unit 6041 and a code storage unit 6042. Retained in the data storage unit 6041 are incoming merchandise data of articles as delivered from the fabrication point δ 104 and regeneration point β 102, consumption data indicating that a delivered article was forwarded to a manufacturing process for fabrication of products, stock data of fabrication point γ 103 and others.

An explanation will next be given of functions built in the machine δ of the lower-level item fabrication point δ 104.

Figure 7:
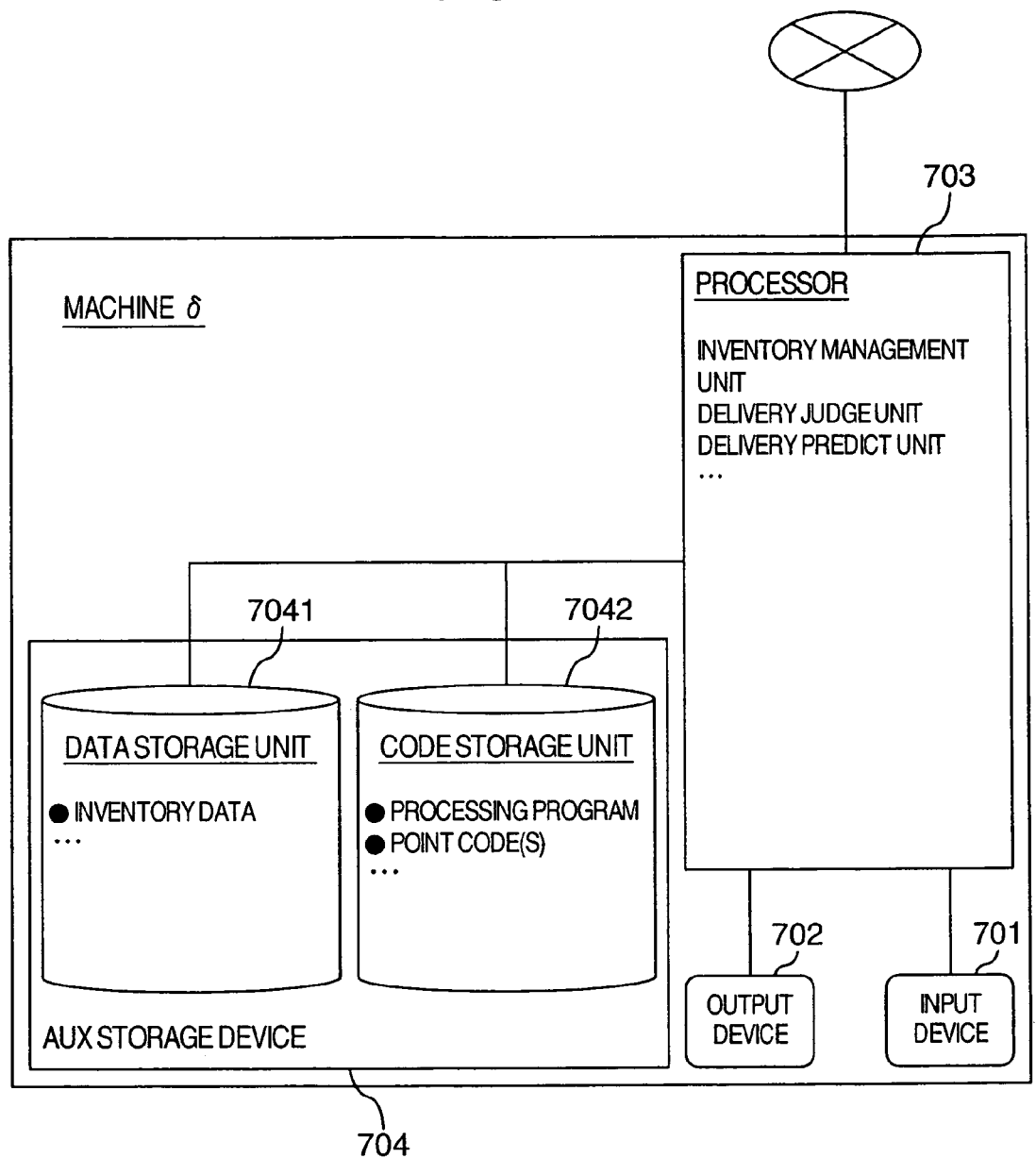
FIG. 7 is a diagram showing functions of a machine δ.

The functions of machine δ are shown in FIG. 7.

A processing device 703 of the machine δ performs processings such as inventory management, delivery judgment, delivery prediction and others. The inventory management as performed herein involves, but not limited to, a shipment registration function, stock computation function, stock registration function, and stock information read function or else. The delivery judgment includes a delivery-required item judgment function. The delivery prediction includes a delivery schedule calculation function, delivery schedule registration function, delivery schedule read function, and delivery schedule correction function or equivalents thereof.

An auxiliary storage device 704 of the machine δ also is made up of a data storage unit 7041 and a code storage unit 7042. Retained in the data storage unit are shipment data of articles as sent to the fabrication point γ 103, stock data of the fabrication point δ 104, data of articles to be delivered to the fabrication point γ 103. Let the code storage unit retain various functions of processing programs, base-point codes, etc.

An explanation will next be given of functions built in the machine η for integration of the other machines.

Figure 8:
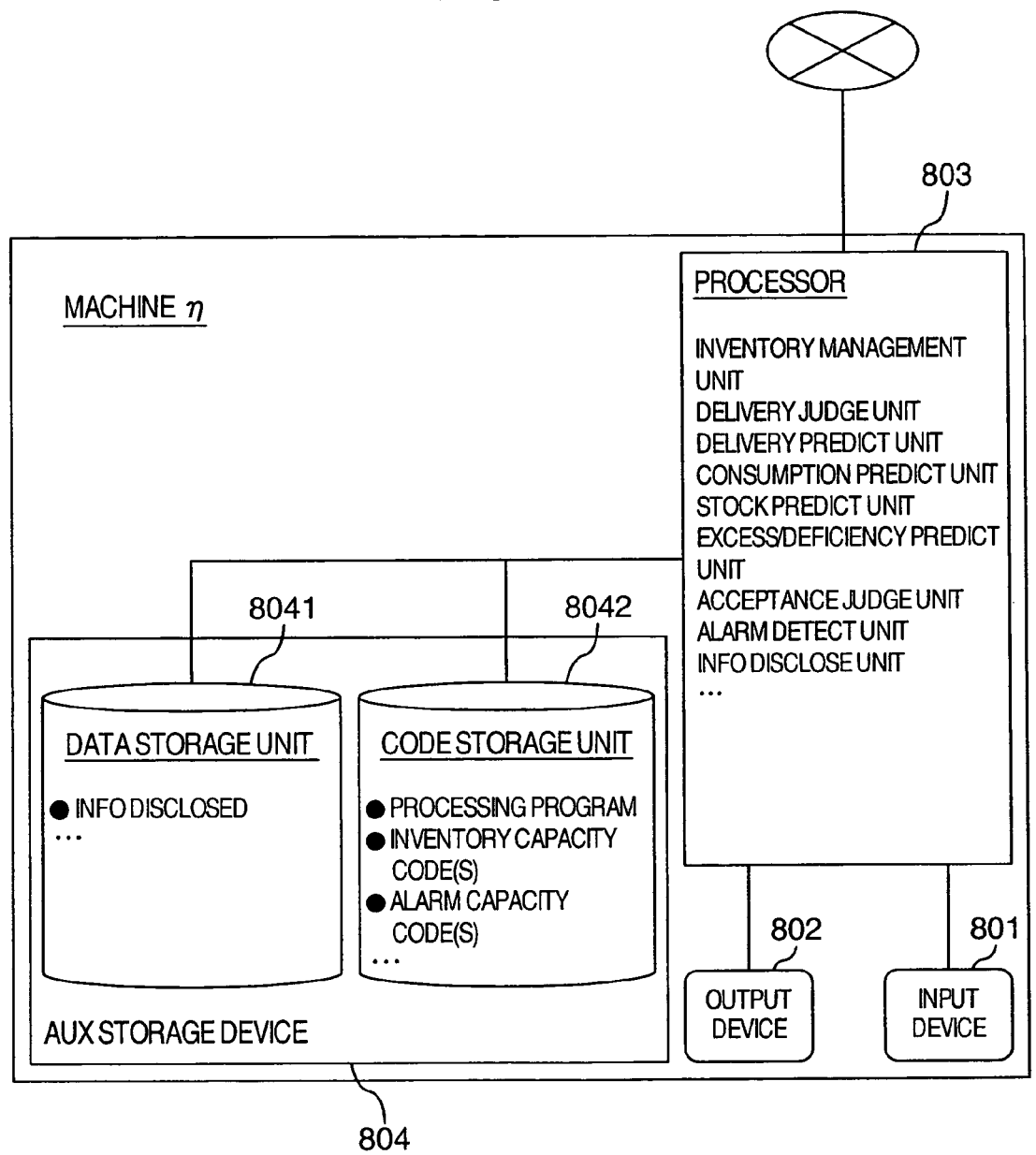
FIG. 8 is a diagram showing functions of a machine η.

The functions of the machine η are shown in FIG. 8.

A processing device 803 of the machine η performs respective processings including, but not limited to, inventory management, delivery judgment, delivery prediction, consumption prediction, stock prediction, excess/deficiency prediction, acceptance judgment, alarm detection, and delivery prediction information disclosure. More precisely explaining as to the functionality of the machine η, first, there is a function of reading consumption prediction, delivery schedule and stock information. And, it has a lower-level item stock prediction function and an excess/deficiency quantity calculation function while having a function of issuing a deliverable item judgment instruction. Further, it performs operations for item acceptance judgment and stock prediction updating. And it has a function of registering a delivery schedule, stock, and excess/deficiency quantity and also has a disclosure function of stock prediction or else, an alarm judgment function, an alarm registration function, an alarm sounding function, etc.

An auxiliary storage device 804 of the machine η also is made up of a data storage unit 8041 and a code storage unit 8042. The data storage unit 8041 stores therein consumption change with time, delivery change, stock change, excess/deficiency quantity change, alarm information and others. The code storage unit stores various functions of processing programs, stock capacity codes, alarm capacity code and so forth.

An explanation will next be given of the machine θ which performs consumption prediction.

Figure 9:
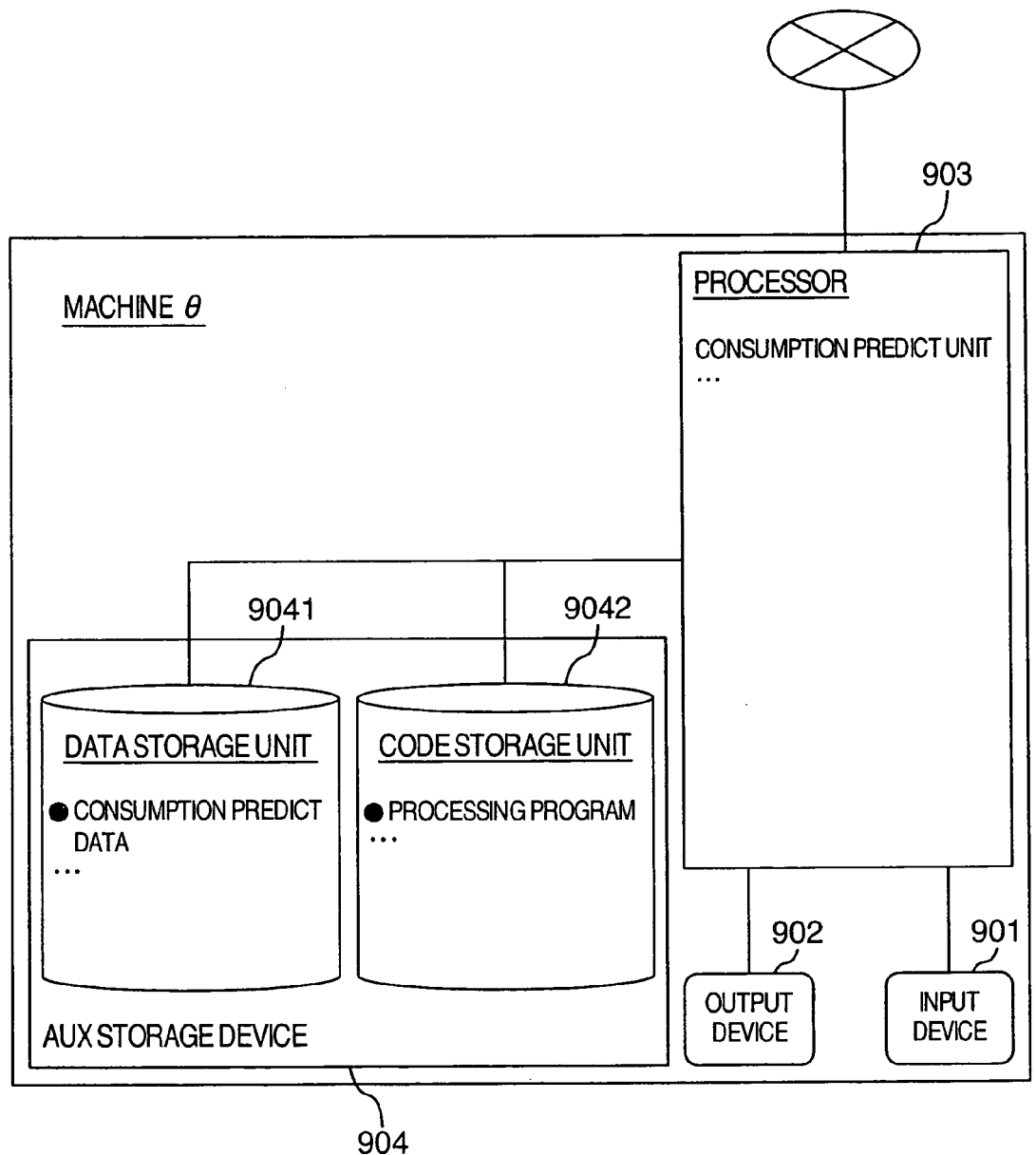
FIG. 9 is a diagram showing functions of a machine θ.

The functions built in machine θ are shown in FIG. 9.

A processing device 903 of the machine θ is designed to perform consumption prediction processing. This consumption prediction processing involves a consumption data read-in function, consumption prediction function, consumption prediction registration function, etc.

An auxiliary storage device 904 of the machine θ also is comprised of a data storage unit 9041 and a code storage unit 9042. The data storage unit 9041 retains therein consumption prediction data predicting that any one of delivered articles gathered to the fabrication point γ 103 is forwarded to a manufacturing process for product fabrication. The code storage unit 9042 stores various functions of processing programs or else.

(5) Processing Flow

An explanation will next be given of a processing flow of the recycle inventory control system.

Figure 10:
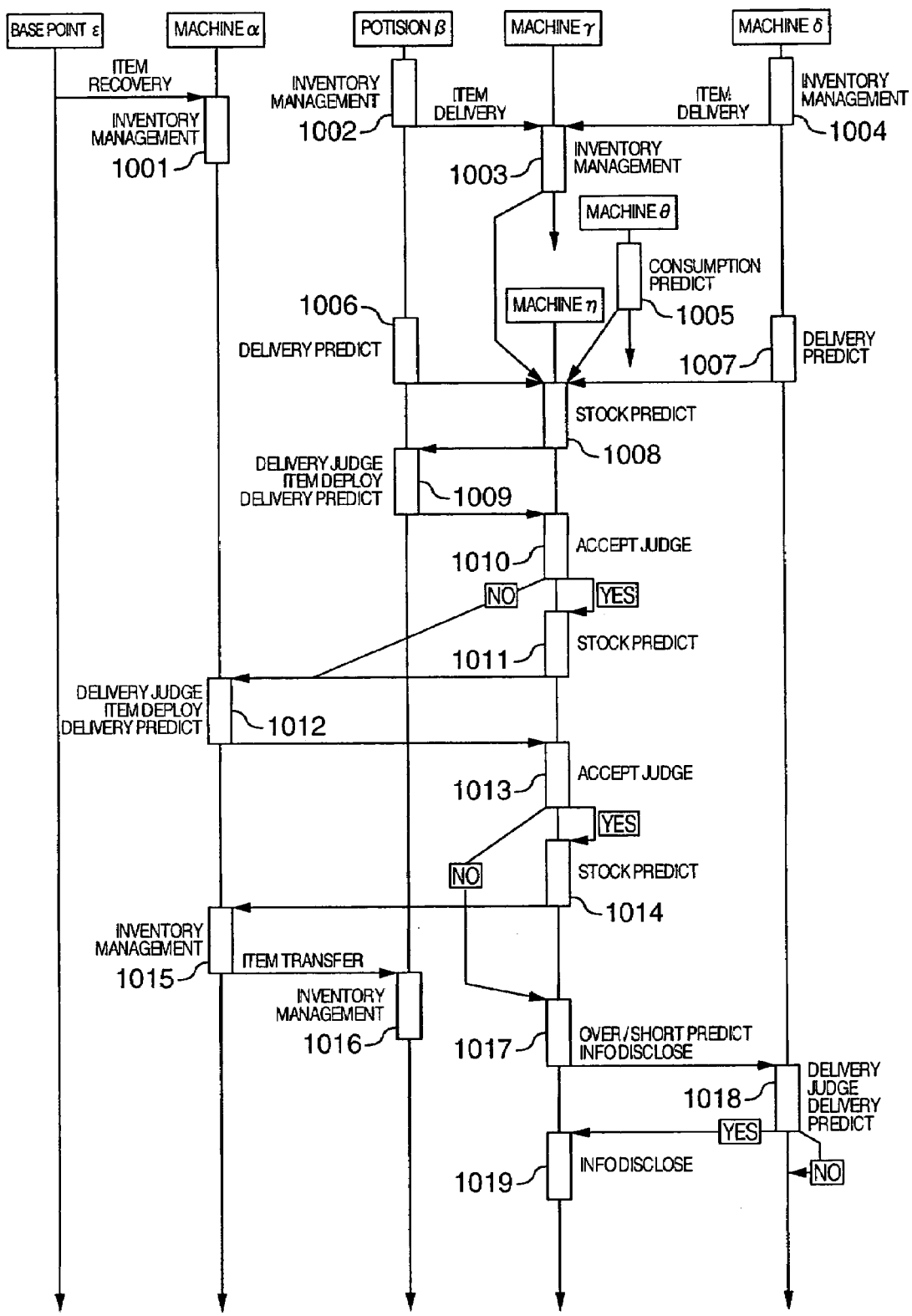
FIG. 10 is a diagram showing a processing flow of one embodiment of this invention.

FIG. 10 is a diagram showing the processing flow of one embodiment of this invention.

Firstly in FIG. 10, when a used product is returned and collected for recovery from the base point ε such as a marketplace or else, create inventory or stock data at the upper-level item recovery point α 101 (at step 1001). Additionally at the lower-level item regeneration point β 102 and lower-level item fabrication point δ 104 also, prepare stock data (step 1002, step 1004). At the upper-level item fabrication point γ 103, create stock data in response to receipt of delivery of an item(s) from the lower-level item regeneration point β and lower-level item fabrication point δ (step 1003).

On the other hand, create consumption prediction data of a lower-level item in the machine θ (step 1005). When it is required to change or modify the delivery schedule of the lower-level item on the basis of a regeneration processing circumstance of the lower-level item regeneration point β 102, perform processing for delivery prediction at the lower-level item regeneration point β and then correct the delivery schedule, followed by registration thereof (step 1006). Similarly, when it is necessary to modify the schedule of a lower-level item being sent to the upper-level item fabrication point based on the manufacturing circumstance of the lower-level item fabrication point δ 104, perform delivery prediction at the lower-level item fabrication point δ and then correct the delivery schedule, followed by registration (step 1007). The processings of from the step 1001 up to step 1007 are such that the processing is executed once at a time whenever a data change occurs.

At the upper-level item fabrication point γ, stock prediction processing gets started periodically with a predetermined cycle (for example, on a per-day basis) (step 1008). This stock prediction processing is a step which collects data of the step 1001 to step 1007, calculates stock prediction based on the data collected, and then instructs start-up of the step 1009. At this step 1009, perform inspection to determine whether the regenerated article of a new lower-level item is deliverable to the upper-level item fabrication point γ 103. And, when it is deliverable, calculate a delivery schedule of the regenerated article of lower-level item and then pass a calculation result to the machine η.

As for the contents of this processing of the step 1009, an explanation will be given with reference to FIG. 21.

Figure 21:
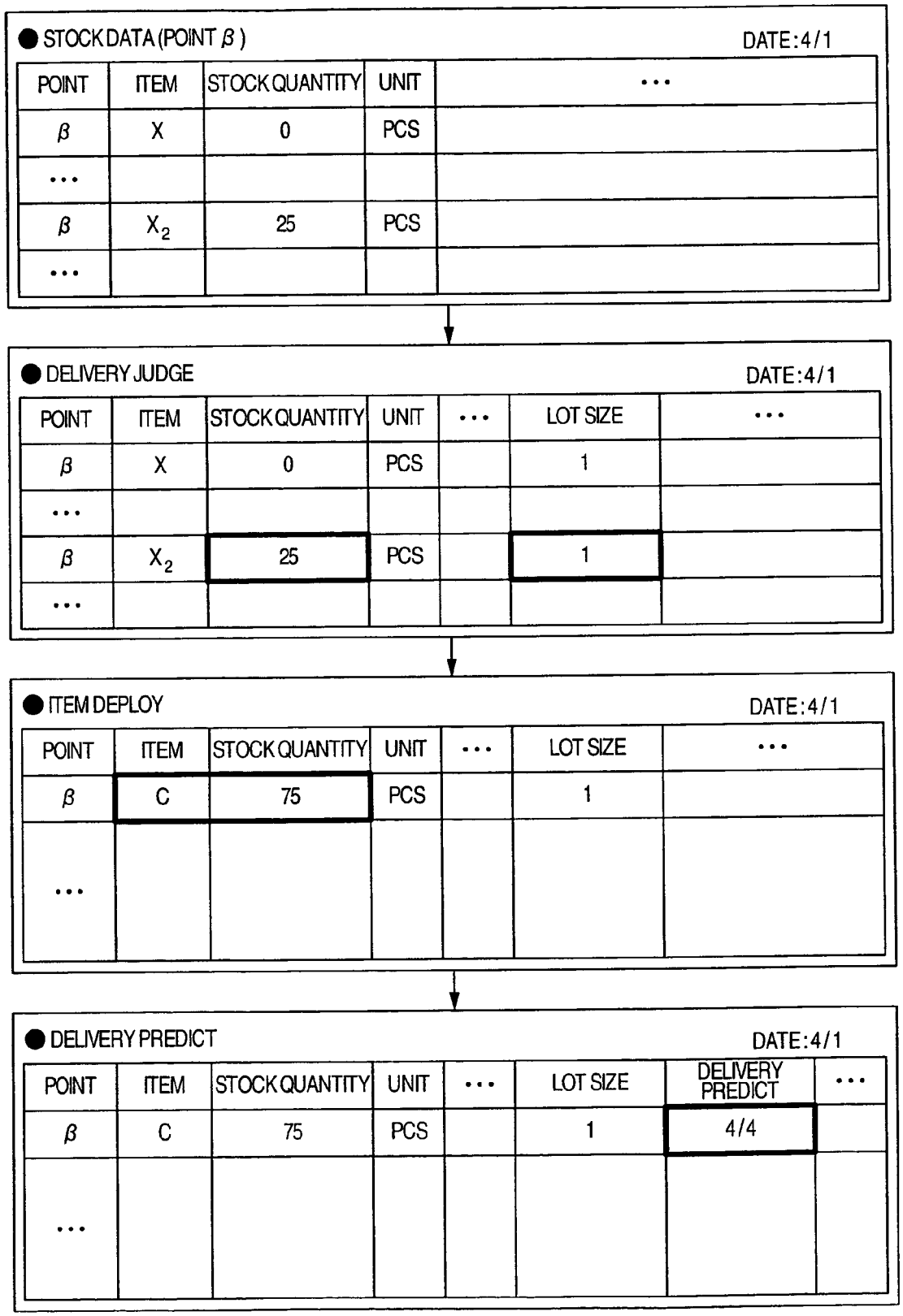
FIG. 21 is a diagram for explanation of delivery prediction processing of regenerated articles.

FIG. 21 is a diagram showing a processing image of the step 1009.

First, the machine β 202 reads the stock data. A result of it is shown in the uppermost drawing of FIG. 21. It can be seen that twenty five (25) pieces of items X2 are present as inventory articles at the lower-level item regeneration point β 102.

Next, based on this information and the base-point codes being held in the code storage unit of the machine β 202, determine whether delivery to the fabrication point γ 103 is possible or not (i.e., determine whether it is possible to clear a lot size constraint between the regeneration point β 102 and fabrication point γ 103). This situation is shown in the second-upper drawing of FIG. 21. It is apparent that 25 inventory articles are of more than one lot size. In other words, it was judged that any lower-level item of the items X2 is deliverable to the fabrication point γ 103.

Next, based on such determination result and the item tree code being retained in the code storage unit of the machine β 202, lower-level item deployment processing is executed. A result of it is shown in the third upper drawing of FIG. 21. It is seen that item X2 can be deployed into items c: regarding the quantity, seventy five (75) ones can be taken out. Next, delivery foreordination or schedule is calculated based on this result and a lead time of a process between the regeneration point β 102 and fabrication point γ 103, which is retained in the code storage unit of the machine β 202. A result thereof is shown in the lowermost drawing of FIG. 21. It can be seen that 75 pieces of items c are deliverable to the fabrication point γ 103 on April 4.

Returning to FIG. 10, an explanation will be given of the processing to be performed at the upper-level item fabrication point γ in response to receipt of the delivery prediction result at the step 1009.

A step 1010 is the step which performs item acceptance judgment based on the stock prediction result of the step 1008 and the delivery prediction result of step 1009 along with the stock capacity as retained in the code storage unit of the machine η 205.

Figure 22:
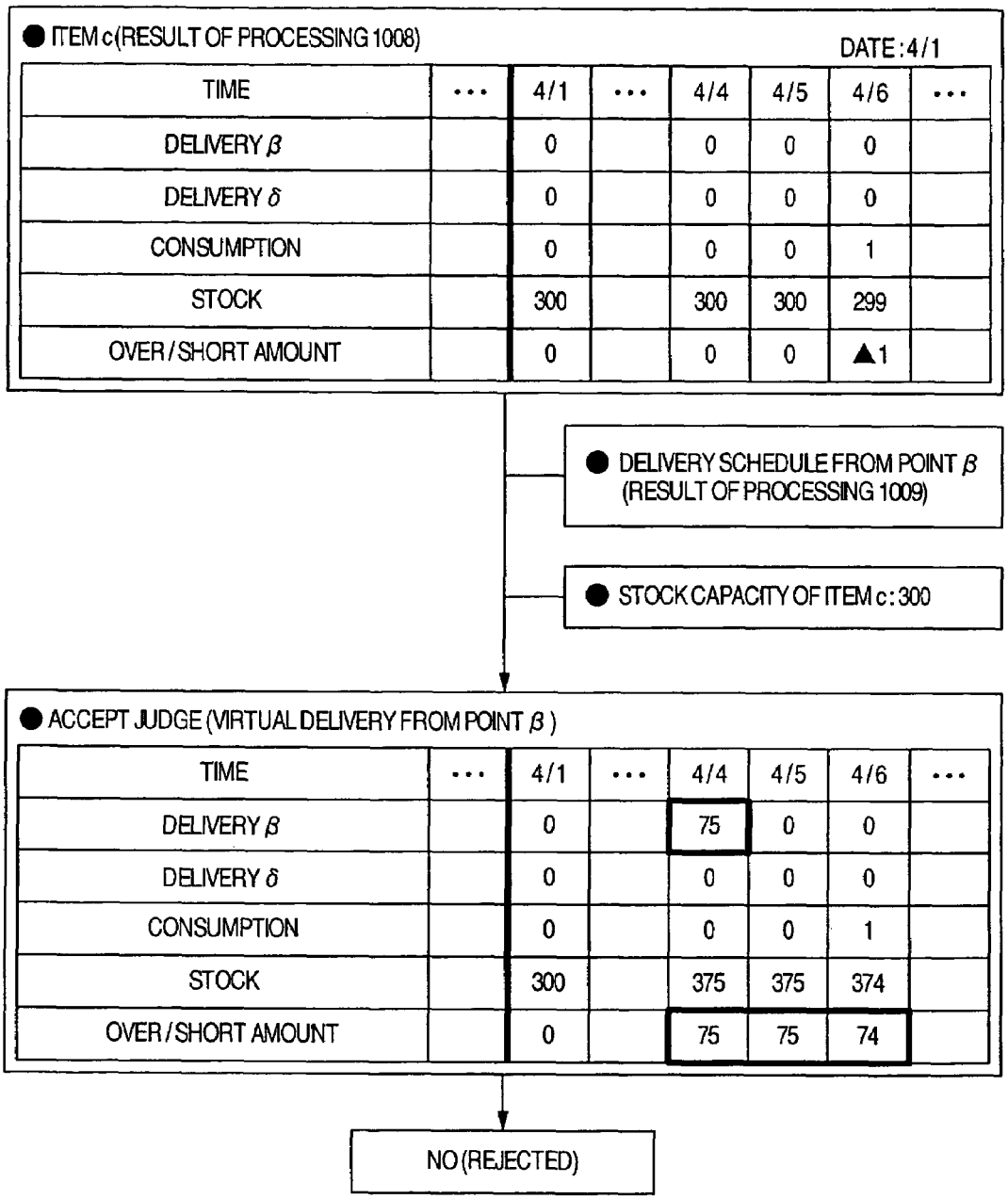
FIG. 22 is a diagram explaining acceptance judgment processing of the regenerated articles.

An image drawing of the processing of the step 1010 is shown in FIG. 22.

An example shown in FIG. 22 indicates that if 75 pieces of items c are delivered to the fabrication point γ 103 on April 4 then the resultant stock quantity changes from 300 to 375. This is judged so that delivery is rejected because it goes over the value of stock capacity equal to 300 pieces.

Next, a stock prediction step 1011 will be set forth. This stock prediction processing is a step which updates the stock prediction information of an item that was allowed to be delivered at the step 1010.

A step 1012 is the step that inspects to determine whether any new recovered or "salvaged" article can be delivered to the fabrication point γ 103 and, in case the article is deliverable, calculates a delivery schedule thereof and then passes such a result to the machine η 205.

Regarding the processing contents of this step 1012, an explanation will next be given using FIG. 23.

Shown in FIG. 23 is a processing image drawing of delivery judgment, item deployment and delivery prediction of the upper-level item recovery point α.

Firstly, the machine α 201 reads stock data. Its result is shown in the uppermost drawing of FIG. 23. It would be readily understood that at the recovery point α 101, twenty five (25) pieces of items X and twenty (20) items Y plus thirty (30) items Z are present as inventory articles in stock. Next, based on this information and the base-point codes being saved in the code storage unit of the machine α 201, determine whether delivery to the fabrication point γ 103 is permissible or not (i.e., judge whether the lot size constraint between the recovery point α 101 and fabrication point γ 103 is cleared). This situation is shown in the second upper drawing of FIG. 23. As apparent from this drawing, only the item X is such that the stock quantity is more than or equal to the lot size. In short, it was judged that any lower-level item of the items X is deliverable to the fabrication point γ 103.

Next, lower-level item deployment processing is executed based on such judgment result and the item tree code being held in the code storage unit of the machine α 201. A result of it is shown in the third upper drawing of FIG. 23. It is readily understandable that the items X can be deployed into items a, items b and items c. It is also seen that regarding the quantity, 25, 25 and 75 ones can be taken out respectively. Next, a delivery schedule is computed based on the above-noted result and the lead time of a process between the recovery point α 101 and fabrication point γ 103 which is saved in the code storage unit of the machine α 201. A result of it is shown in the lowermost drawing of FIG. 23. It can be seen that 25 pieces of items a can be delivered to the fabrication point γ 103 on April 5. It is also seen that 25 pieces of items b are deliverable to fabrication point γ 103 on April 6. It is also seen that 75 items c are deliverable to fabrication point γ 103 on April 7.

An explanation will next be given of the processing to be executed at an acceptance judgment step 1013.

The acceptance judgment step 1013 is a step which performs acceptance judgment based on the stock prediction processing result of step 1008, the delivery prediction result of step 1012, and the stock capacity being retained in the code storage unit of machine η 205.

Figure 24:
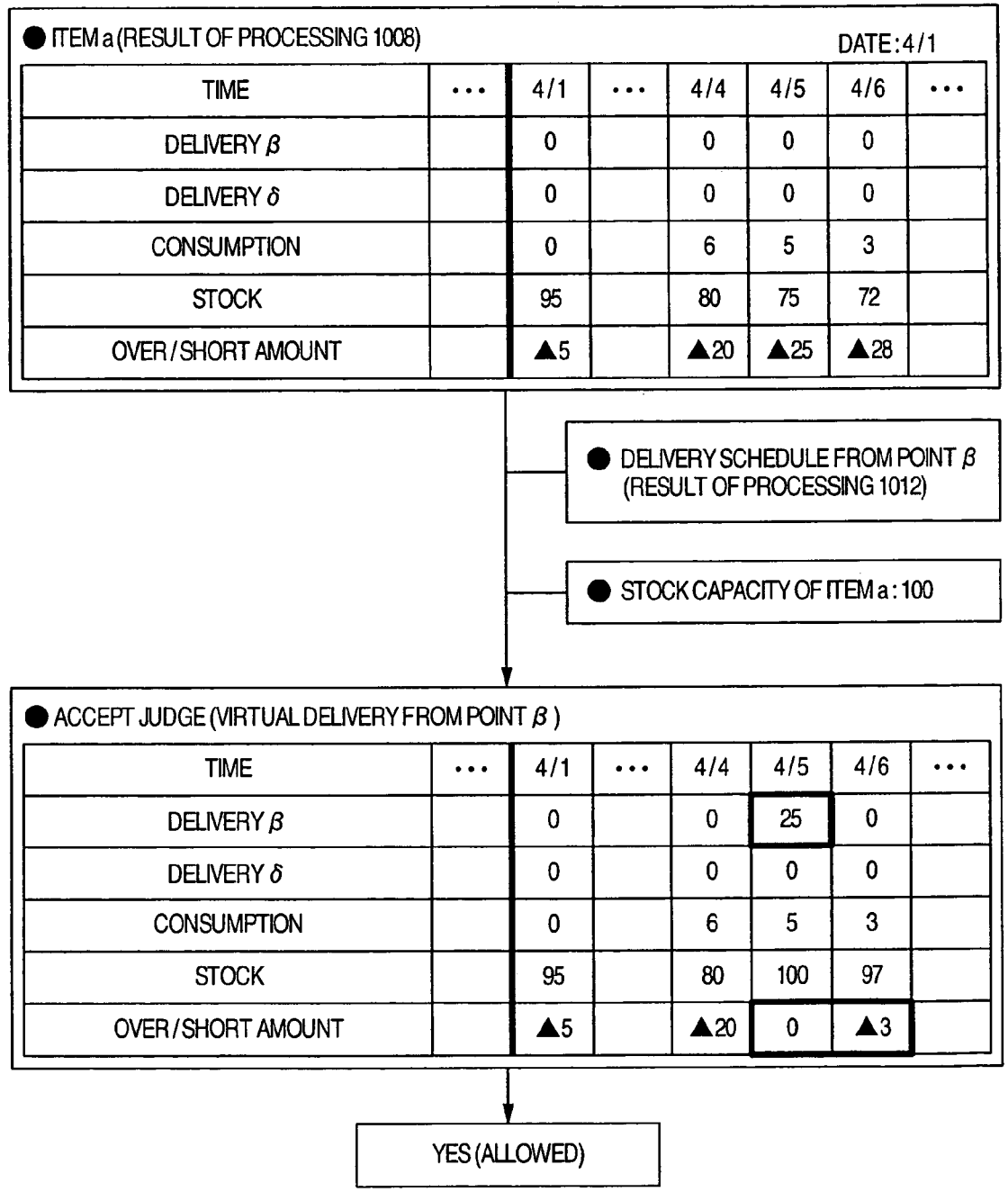
FIG. 24 is a diagram explaining acceptance judgment processing of the recovered articles.

An image drawing of the processing of this acceptance judgment step 1013 is shown in FIG. 24.

In FIG. 24, delivery of 25 pieces of items a to the fabrication point γ 103 on April 5 results in the stock quantity changing from 75 to 100 pieces. This numerical quantity does not exceed the value of stock capacity which is 100 pieces so that it is judged that the delivery is allowable.

A step 1014 is the step that updates the stock prediction information of the items which are delivery-allowed at the step 1010. A step 1015 and step 1016 are the steps that perform transfer processing of recovered articles from the machine α 201 to machine β 202 based on an update result of the stock prediction information of the step 1014.

At step 1017, determine a time point at which the stock prediction becomes less than a predefined alarm capacity and then store an alarm judgment portion in the data storage unit of the machine η 205. In addition, calculate a stock excess/deficiency amount based on both the stock prediction information that is a result of the processing of from the step 1008 up to step 1017 and the stock capacity being saved in the data storage unit of the machine η 205; then, let a calculation result and the stock prediction information or else be laid open to the other machines while saving such laid-open information in the data storage unit of machine η 205.

Image drawings of this laid-open information are shown in FIGS. 19A-19B, 20, 25 and 26. A step 1016 is the step that calculates based on the laid-open information a quantity of newly delivered articles to be supplied from the fabrication point δ 104 to fabrication point γ 103. A step 1019 is the one that starts up when a delivery schedule is newly issued from the fabrication point δ 104 to fabrication point γ 103: at this step, updating of the laid-open information is performed.

(6) Item Arrangement

An item arrangement in this embodiment will next be set forth.

Figures 11A, 11B:
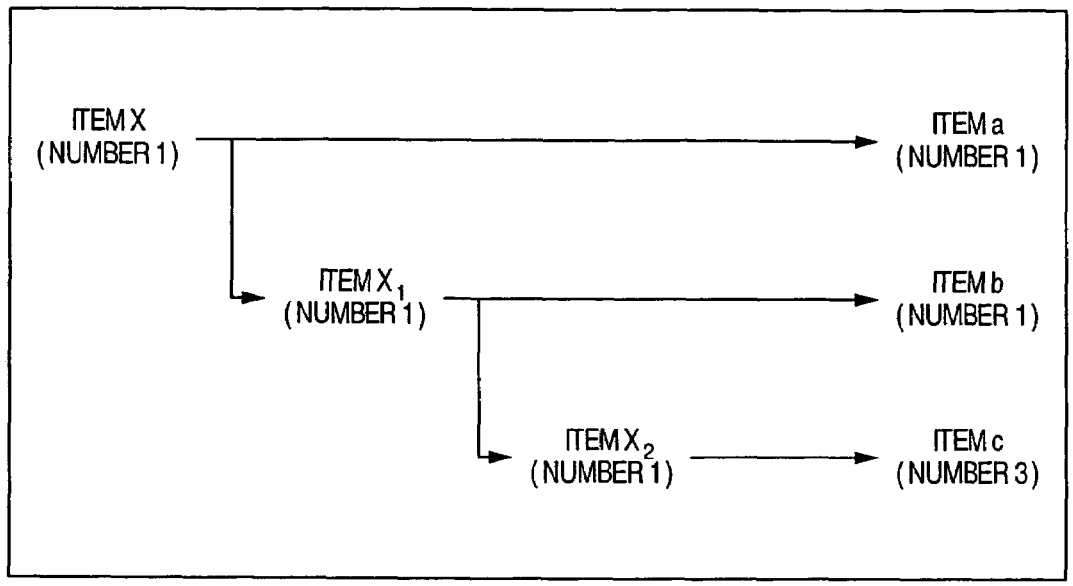
FIGS. 11A and 11B are diagrams for explanation of an item arrangement of one embodiment of the invention.

An item arrangement diagram in this embodiment is shown in FIG. 11A.

An item X is the uppermost level of item ranked in the top. Items with the lowermost level include an item a, an item b and items c. X1 and X2 are items which are at a stage prior to disassembly into the lowermost-level items. In FIG. 11B, count numbers with respect to the uppermost-level items X are such that a, b, $X_1$, $X_2$ are each set at 1, while c is at 3.

(7) Constraint between Base Points

Next, an explanation will be given as to constraints between respective base points provided in the recycle inventory control system.

FIGS. 12A to 13B are diagrams for explanation of constraints between respective base points.

Figures 12A, 12B:
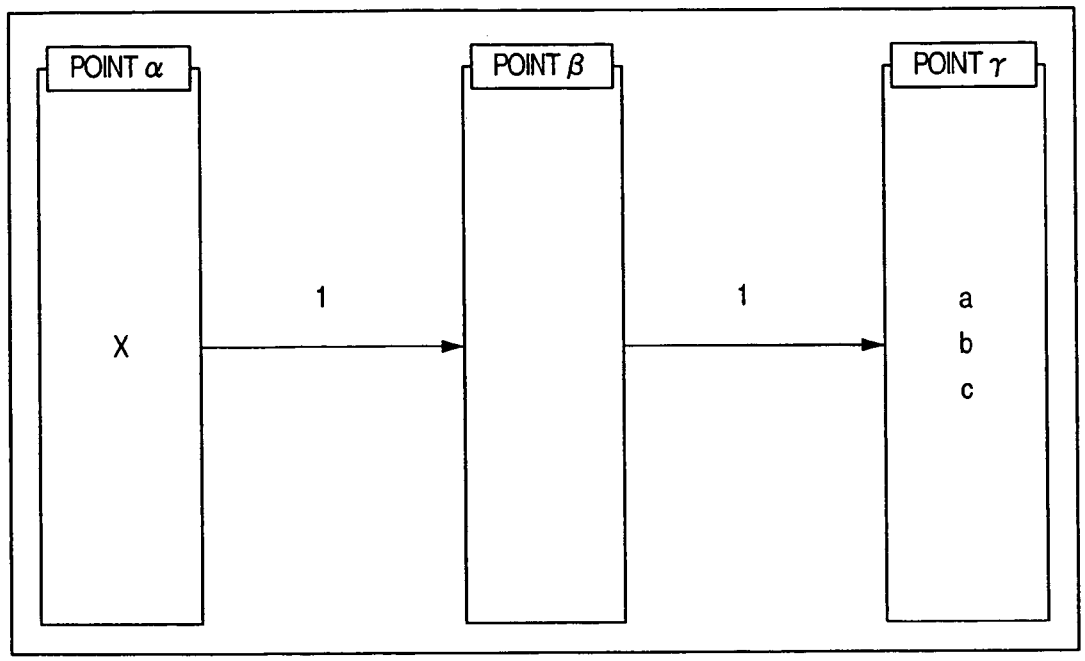
FIGS. 12A and 12B are diagrams used to explain a constraint between base points in a range of from a collection base point α up to a fabrication point γ.

FIGS. 12A and 12B are diagrams showing constraints between the recovery point α 101 and regeneration point β 102 and also between the regeneration point β 102 and fabrication point γ 103 in this embodiment.

The constrains here are a lead time between base points and the size of a lot which moves between base points.

A lead time at a location between the recovery point α 101 and regeneration point β 102 is a one day: a lot size of transportation is 20 pieces. This value "20" means that transportation of items X is not allowed unless twenty ones are present at any recovery base point. Additionally a lead time at a location between the regeneration point β 102 and fabrication point γ 103 is a one day—a lot size of transportation is such that any one of the items a, b and c is a single piece. The quantity of a respective one means that transportation of each item is hardly allowed unless more than one item is present at the regeneration point β 102.

Figures 14A, 14B:
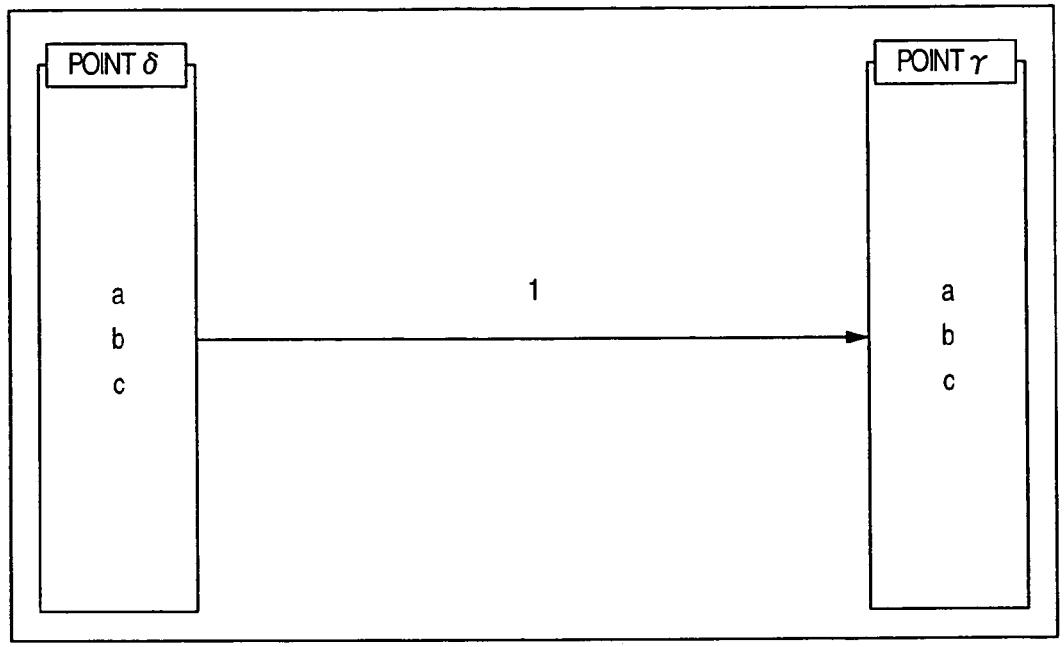
FIGS. 14A and 14B are diagrams explaining an inter-point constraint in a range of from a fabrication point δ to the fabrication point γ.

FIGS. 14A-14B are diagrams showing constrains between the fabrication point δ 104 and fabrication point γ 103.

The constrains here are also a lead time between base points and a lot size which moves between base points. The lead time at a location between the fabrication point δ 104 and fabrication point γ 103 is a one day, and lot sizes of transportation are as follows: the items a are 10 pieces, items b are 20 pieces, and items c are 30 pieces. The quantity of a respective one means that transportation of each item is not allowed unless more than one item is present at the fabrication point δ 104.

(8) Regeneration Process and Process Constraints Next, an explanation will be given of a regeneration process within the regeneration point β 102 and the process constraints thereof.

Figures 13A, 13B:
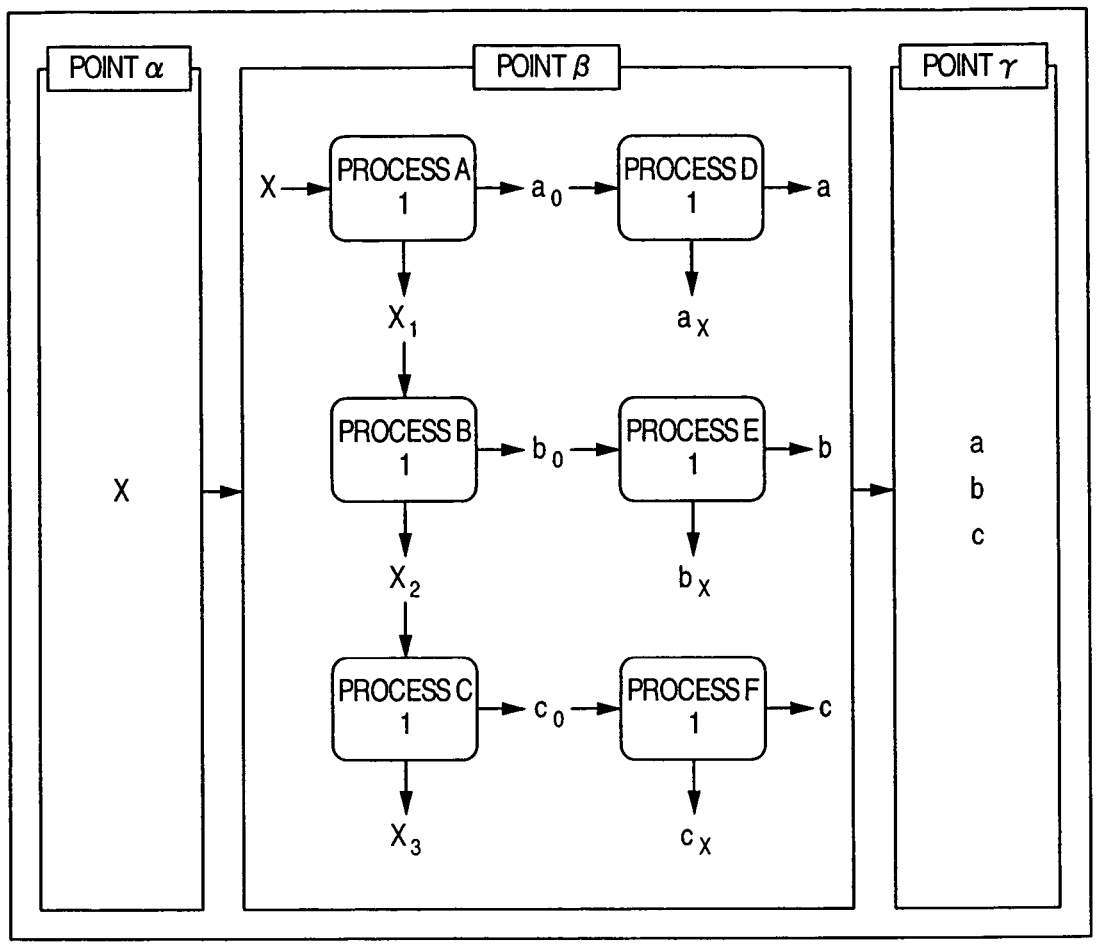
FIGS. 13A and 13B are diagrams explaining a regeneration process and a process constraint at a regeneration point β.

FIGS. 13A-13B are diagrams for explanation of the regeneration process in this embodiment.

An item X which was transferred from the recovery point α 101 becomes items a0 and X1 through a process A with consumption of a lead time equal to one day. The item a0 becomes an item ax and an item a through a process D with consumption of a one-day lead time. The item X1 becomes b0 and X2 through a process B with elapse of a one-day lead time. b0 becomes items bx and b through a process E with elapse of a one-day lead time. X2 becomes c0 and X2 through a process C with elapse of a one-day lead time. c0 becomes items cx and c through a process F with elapse of a one-day lead time. Additionally, ax, bx and cx are equivalent to defective articles.

(9) Stock Capacity Constraints

An explanation will next be given of stock capacity constraints of items.

Figures 15A, 15B, 15C:
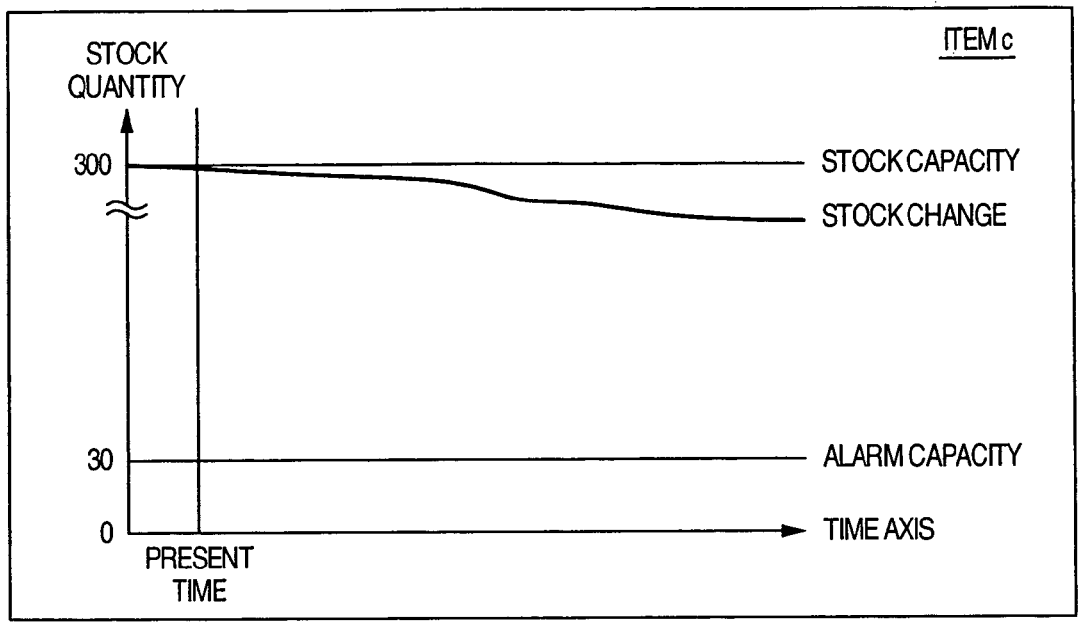
FIGS. 15A to 15C are diagrams explaining a stock capacity constraint of one embodiment of this invention.

FIGS. 15A to 15C are diagrams for explanation of the stock capacity constraints of the items.

FIGS. 15B and 15C indicate a stock capacity per item and a stock lower limit amount for alarm generation (hereinafter, referred to as "alarm capacity") in this embodiment. The stock capacity is equivalent to an upper limit value which is incapable of supplement of any further inventory articles. Here, the stock capacities of respective items are as follows: the capacity of items a is set at 100 pieces; items b are 200 pieces; and, items c are 300 pieces. In addition, the alarm capacity is such that the items a are 10, items b are 100, and items c are 30 pieces.

(10) Inventory Data

Next, an explanation will be given of a table structure of inventory or stock data to be stored in the auxiliary storage device 304.

FIGS. 16A to 17B are diagrams showing the table structure of the inventory data.

A table has a base-point column, an item column, a stock quantity column, a unit column and others. In the base-point column, the names of base points in process of inventory management are retained. At the recovery point α 101, "α" is retained. Similarly, "β" is stored at the regeneration point β 102; "γ" is held at the fabrication point γ 103; "δ" is at fabrication point δ 104. At the recovery point α 101, X which is the uppermost level of item or else is held. At the regeneration point β 102, the status of items covering from the uppermost item to lowermost item is held. Held at the fabrication point γ 103 and point δ are the items a that are the lowermost items or the like. The stock quantity of items is held in the stock quantity column.

In FIGS. 16A-17B, the stock quantity of items X of the recovery point α 101 is 25 pieces by way of example (currently on April 1). Retained in the unit column is the unit in the event for counting inventory articles. For example, the unit of items X of the recovery point α 101 is "piece(s)."

(11) Consumption Prediction Data

Next, an explanation will be given of a table structure of consumption prediction data to be stored in the auxiliary storage device 304.

FIG. 18 is a diagram showing the table structure of the consumption prediction data.

What is shown in FIG. 18 is a table structure of consumption prediction data of the lowermost-level item at the fabrication point γ 103 in this embodiment. In this table, there are provided an item column, consumption prediction column and so forth. The title of such lowermost-level item is retained in the item column. For instance, items a, b, c and others are held therein. In the consumption prediction column, a consumption prediction amount occurring from a present day to a near future is held. For example, as for the item a, the consumption prediction amount is held in such a manner that zero pieces are consumed on April 1, four ones are consumed on April 2, and five ones on April 3.

(12) Display Screen

Next, display screen examples of this embodiment will be explained.

Regarding screen pages to be displayed on the output device 302, an explanation will be given using FIGS. 19A-19B, 20, 25 and 26.

FIGS. 19A and 19B are diagrams showing display examples of an initial screen.

The display examples of the initial screen in this embodiment are as shown in FIGS. 19A-19B. On this screen, a stock excess/deficiency amount per item is displayed periodically at certain time intervals. FIG. 19A shows a stock excess/deficiency amount at a time point of March 31. FIG. 19B is a stock excess/deficiency amount which is resulted from execution of the processings of from the step 1010 up to step 1023 on April 1. Additionally, upon clicking on a one line of the table being presently displayed, transition is done to a detailed screen of stock change such as any one of the examples shown in FIG. 20, 25 and 26. In FIG. 19, when a "Close" button is depressed, the initial screen is closed. Note here that alarm generation is indicated by a black frame in FIG. 19.

Figure 20:
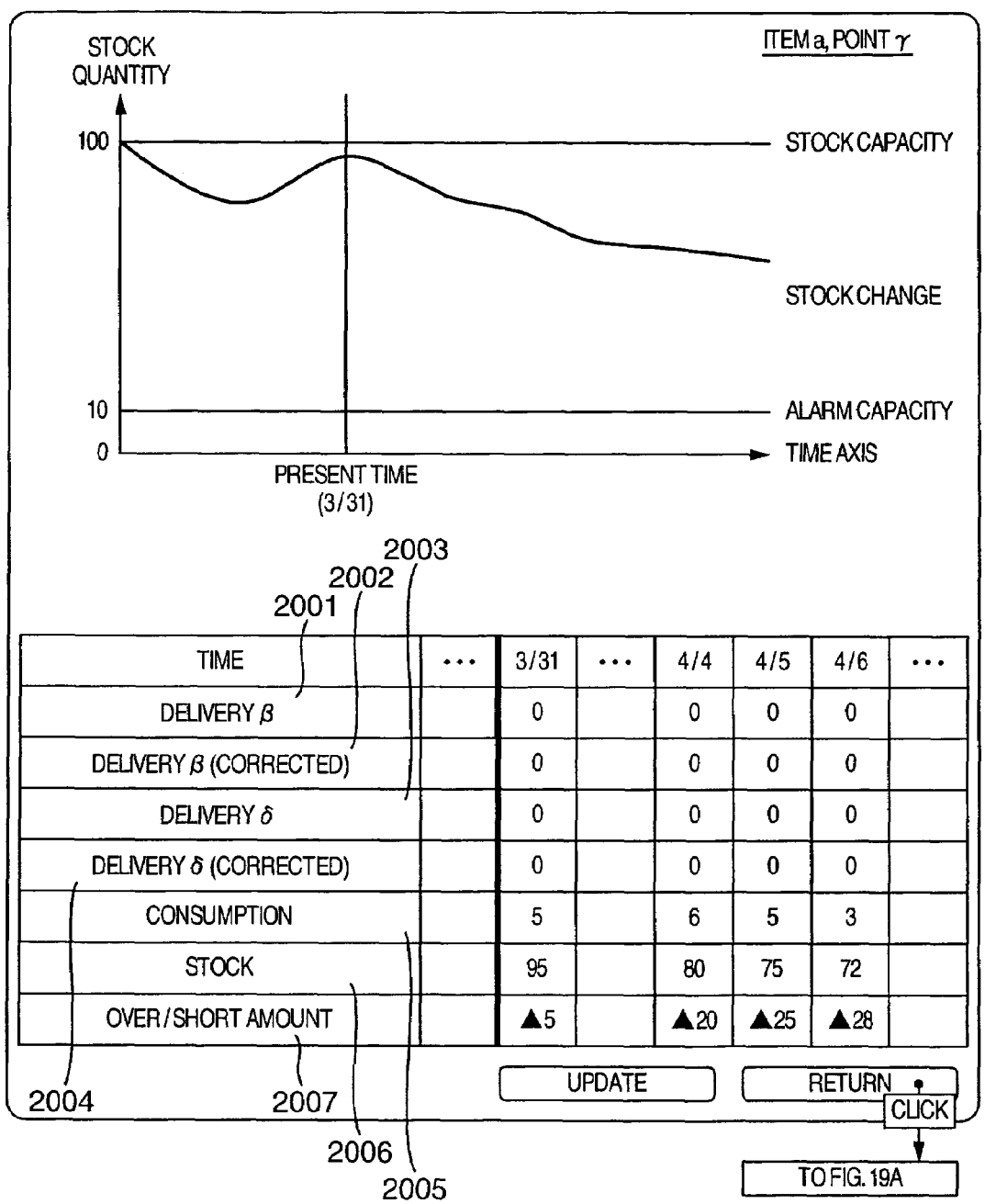
FIG. 20 is a diagram showing a display example of a detailed screen of stock change.
Figure 25:
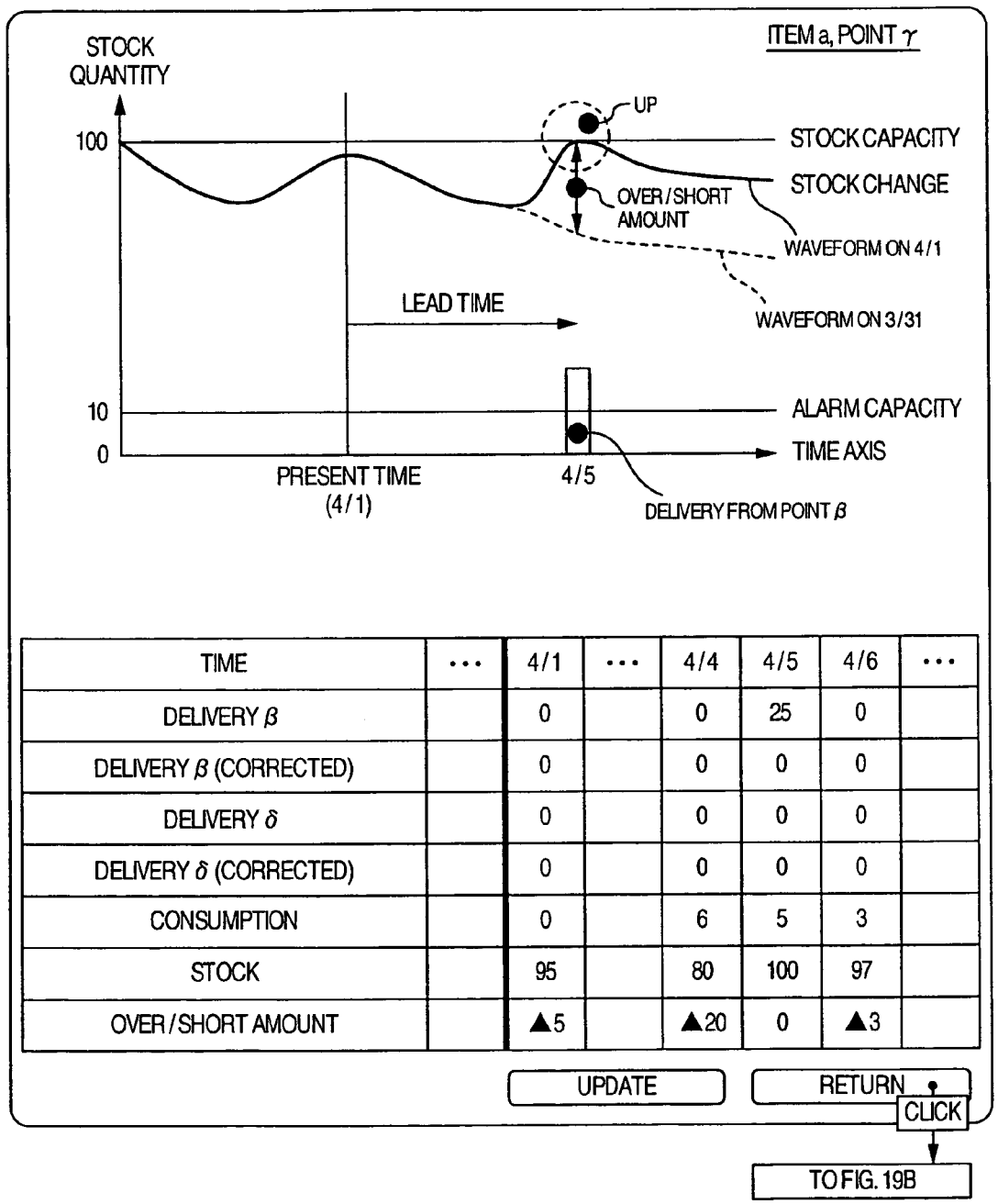
FIG. 25 is a diagram showing a display example of a detailed screen of stock change.
Figure 26:
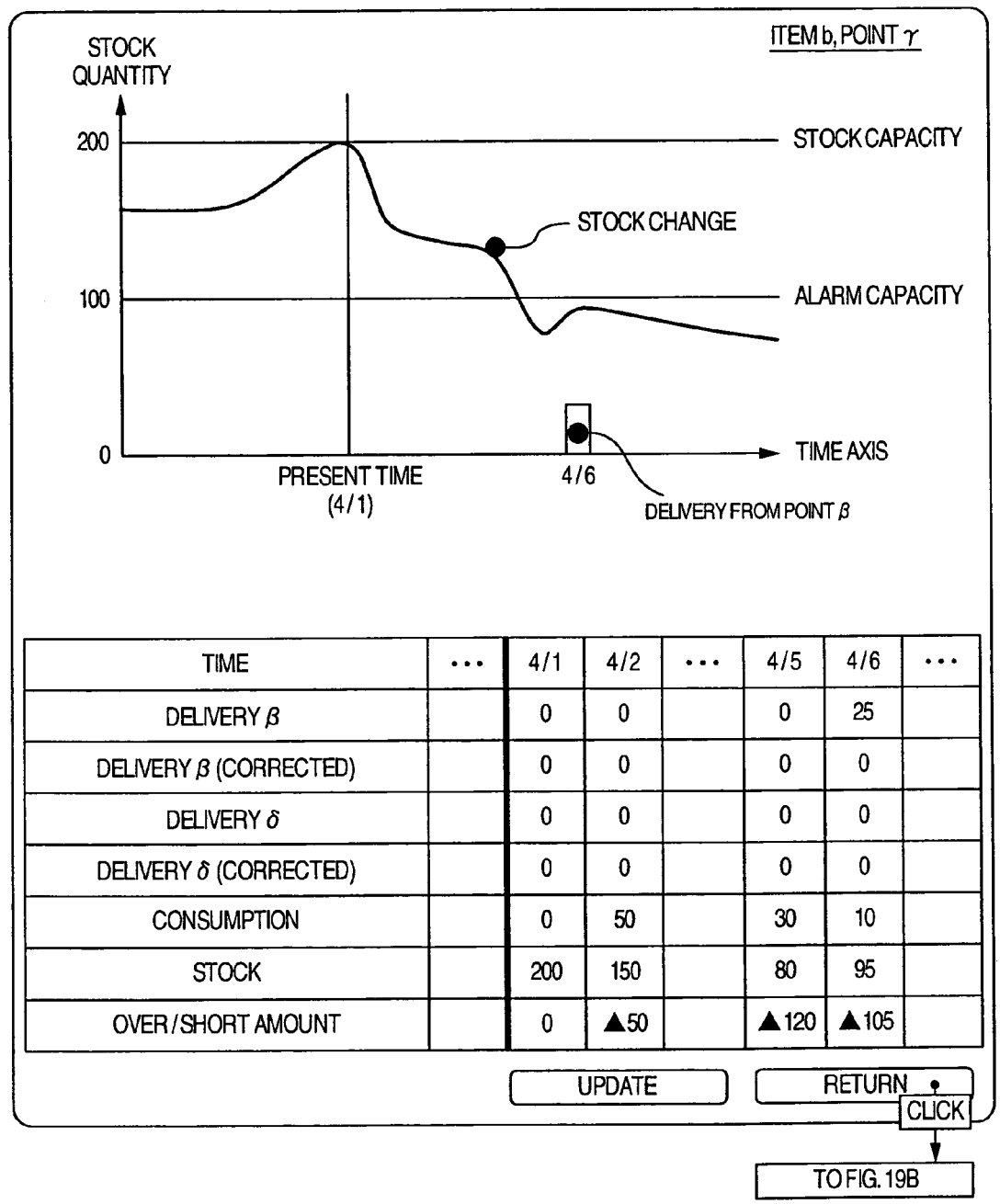
FIG. 26 is a diagram showing another display example of a detailed screen of stock change.

FIGS. 20 and 25-26 are diagrams each showing a display example of the detailed screen of a stock change with time.

On the screen, a stock change chart is displayed along with its associative information in a list-up format, wherein the information involves delivery β 2001 (schedule and actual result) indicating delivery from the regeneration point β 102, delivery β (corrected) 2002, delivery δ 2003 (schedule and result) indicative of delivery from the fabrication point δ 104, delivery δ (corrected) 2004, consumption 2005 (schedule and result), stock status 2006 of the fabrication point γ 103, and stock excess/deficiency amount 2007 of inventory articles. At the delivery β 2001 and delivery δ 2003, the information being stored in the data storage unit of the machine η 205 is read out and displayed. At the delivery β (corrected) 2002, the information being saved in the data storage unit of the machine β 202 is read and displayed. At the delivery δ (corrected) 2004, the information being retained in the data storage unit of the machine δ 204 is read and displayed. At the consumption 2005, the information being saved in the data storage unit of the machine θ 206 is read and displayed. At the stock status 2006, there is displayed a result of stock prediction which was done based on the information of the delivery β (corrected) 2002, delivery δ (corrected) 2004 and consumption 2005 along with a present stock status of the fabrication point γ 103 which is stored in the data storage unit of the machine γ 203. Displayed at the stock excess/deficiency amount 2007 is a result of calculation based on both the information of the stock status 2006 and the stock capacity saved in the data storage unit of machine η 205.

In cases where a user of the regeneration point β 102 is required to change or modify the delivery schedule based on a regeneration processing situation of the regeneration point β 102, let the machine β 202 display this screen, thereby enabling the user to input a numerical value to the delivery β (corrected) 2002. Note that the other information such as the consumption 2005, stock status 2006 and stock excess/deficiency amount 2007 or the like is read out of the data storage unit of the machine η (step 1006). The user of the regeneration point β 102 inputs a new delivery schedule at the delivery β (corrected) 2002. Upon depressing an "Update" button, the result is reflected so that the new delivery schedule is registered to the data storage unit of the machine β. Alternatively, in case it is necessary for an user of the fabrication point δ 104 to modify the detailed screen in such a way as to change the delivery schedule based on a fabrication situation at the fabrication point δ 104, letting it be displayed at the machine δ 204 enables the user to input a numerical value to the delivery δ (corrected) 2004. Additionally, the other information such as the consumption 2005, stock status 2006 and stock excess/deficiency amount 2007 or the like is read out of the data storage unit of the machine η (step 1007). The user of the regeneration point δ 104 inputs a new delivery schedule at the delivery δ (corrected) 2004. When pressing the Update button, the result is reflected so that the new delivery schedule is registered to the data storage unit of machine δ.

FIG. 20 is a diagram to be displayed after having clicked on a portion of the item a of FIG. 19A, wherein a present time is March 31. FIG. 25 is a diagram to be displayed after clicking on the portion of item a of FIG. 19B, wherein a present time is April 1. FIG. 25 is a screen resulted from execution of the processings of from the step 1008 up to step 1019; due to this, the information of the delivery 2003 and the stock status 2006 plus the stock excess/deficiency amount 2007 has been modified from the screen contents of FIG. 20 at the time point of March 31. In short, at a time point of April 5, twenty five (25) articles are scheduled to be delivered from the regeneration point β 102: such result is reflected thereto. FIG. 26 is a diagram to be displayed after having clicked on a black-framed portion of FIG. 19B, wherein a present time is April 1. FIG. 26 indicates that execution of the processings up to the step 1019 results in a decrease to less than the alarm capacity on and after April 5. In other words, the items b are below a level of 100 pieces that is the alarm capacity of items b, on and after April 5.

In accordance with the present invention, synchronization is established between a regeneration plan of recovered articles and a delivery/fabrication plan so that it is possible to reasonably lessen the stock excess/deficiency of inventory articles at a confluence point of regenerated articles and newly delivered articles. Additionally with this feature, each workload becomes smaller.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. An inventory control system for controlling a stock quantity of lower-level items used to produce items in production processes thereof, said system comprising:
   a first database configured to register as configuration information of items to be handled by the system an item tree code set comprising at least upper-level items, lower-level items and a number of the lower-level items with respect to the upper-level items, by linking via a network a plurality of information processing machines and a total management information processing machine constituted from any one of the information processing machines and a separate information processing machine, wherein the information processing machines are provided at one of an upper-level item recovery point for collecting used items from a market, a regeneration point for disassembly/regeneration of lower-level items from collected upper-level items, an upper-level item production point for producing new upper-level items, and a lower-level item production point for producing new lower-level items;
   a second database configured to register lead times for moving between the points and the size of a lot per item between the points;
   a third database configured to register an input item, an output item and a procession lead time in a regeneration process of the regeneration point;
   a forth database configured to register a stock capacity per item, a stock lower limit amount for alarm generation and an inventory data including data of at least an item name, a stock quantity and a unit;
   means for updating stock data stored in the fourth database of each point in the information processing machine provided at each point at a time of completion of collection of used items from the market, at a time of receipt of delivery of an item, or at a time of carry-out of an item to another point;
   means for preparing a delivery schedule of a regenerated lower-level item in a cyclic manner based on a lower-level item regeneration processing situation, the inventory data of each of the points and data in the second and third databases in the information processing machine of the regeneration point, and for reporting the delivery schedule to the total management information processing machine;
   means for preparing a delivery schedule of a produced lower-level item in a cyclic manner based on a lower-level item manufacturing situation, the inventory data of each of the points and data of the second database in the information processing machine of the lower-level item manufacturing point, and for reporting the delivery schedule to the total management information processing machine;
   means for performing stock prediction of the upper-level item production point based on consumption prediction data of the lower-level item as prepared cyclicly in accordance with stock data of the upper-level item production point, delivery schedule data of the regenerated lower-level item, delivery schedule data of the produced lower-level item and fabrication planning;
   means for receiving from the lower-level item regeneration point a report indicating whether a newly deliverable regenerated lower-level item is present or absent along with a delivery schedule thereof and for updating stock prediction information of the newly deliverable registered lower-level item of the upper-level item production point when it is determined that the lower-level item is acceptable based on a result of the stock prediction and the stock capacity;
   means for receiving from said upper-level item recovery point a report indicating whether a deliverable lower-level item which is expansion-processed according to the item tree code registered in the first database from a collected good is present or absent following the processing for updating the stock prediction information, for updating stock prediction information of the lower-level item which is expansion-processed from a newly deliverable collected good when the lower-level item is judged to be acceptable based on the stock prediction result and the stock capacity and for disclosing the stock prediction information to the other information processing machines;
   means for receiving the report of the delivery schedule, and for issuing to the upper-level item recovery point an instruction to transfer management of the collected good containing the lower-level item that was judged to be acceptable to the lower-level item regeneration point;
   means for issuing a delivery instruction to an information processing machine which manages a production point of an item having a stock prediction that is less than a lower limit of a stock amount; and
   means for receiving delivery schedule information of the lower-level item reported by the information processing machine which manages a production point of the lower-level item after the delivery instruction to the information processing machine which manages the production point of the lower-level item, for updating the stock prediction information of the item and for disclosing the stock prediction information to the other information processing machines.

2. An inventory control method for controlling a stock quantity of lower-level items used to produce items in production processes thereof, the method used with a system configuration operative to link via a network a plurality of information processing machines and a total management information processing machine constituted from any one of the information processing machines or a separate information processing machine, the information processing machines being respectively provided at an upper-level item recovery point for collecting used items from a market, a regeneration point for disassembly/regeneration of lower-level items from collected upper-level items, an upper-level item production point for producing new upper-level items, and a lower-level item production point for producing new lower-level items, said method comprising:

generating, in the information processing machines provided at the upper-level item production point and the upper-level item recovery point, a database arranged to register as configuration information of items to be handled by the system an item tree code set comprising at least upper-level items, lower-level items and a number of the lower-level items with respect to the upper-level items;

generating a stock database in the information processing machine provided at each point;

causing the information processing machine provided at each point to update the stock database of each point at a time of completion of collection of used items from the market, at a time of receipt of delivery of an item, or at a time of carry-out of an item to another point;

causing the information processing machine provided at the regeneration point to prepare a delivery schedule of a regenerated lower-level item in a cyclic manner or based on a lower-level item regeneration processing situation, and report the delivery schedule of the regenerated lower-level item to the total management information processing machine;

causing the information processing machine provided at the low-level item production point to prepare a delivery schedule of a produced lower-level item in a cyclic manner or based on a lower-level item manufacturing situation, and report the delivery schedule of the produced lower-level item to the total management information processing machine;

causing any one of the information processing machine provided at the upper-level item production point and the total management information processing machine to perform stock prediction of the upper-level item production point based on consumption prediction data as prepared cyclicly in accordance with stock data of the upper-level item production point, delivery schedule data of the regenerated lower-level item, delivery schedule data of the produced lower-level item, and production planning;

causing any one of the information processing machine provided at the upper-level item production point and the total management information processing machine to receive from the lower-level item regeneration point a report indicating whether a newly deliverable regenerated lower-level item is present or absent along with a delivery schedule thereof and update stock prediction information of the newly deliverable regenerated lower-level item when it is judged that the newly deliverable regenerated lower-level item is acceptable based on a result of the updated stock prediction information and a stock capacity;

causing any one of the information processing machine provided at the upper-level item production point and the total management information processing machine to receive from the upper-level item recovery point a report indicating whether a lower-level item which is expansion-processed from a newly deliverable collected good is present or absent along with a delivery schedule thereof and update stock prediction information of the expansion-processed lower-level item when the expansion-processed lower-level item is judged to be acceptable based on the result of the updated stock prediction information and the stock capacity;

causing any one of the information processing machine provided at the upper-level item production point and the total management information processing machine to receive the report of the delivery schedule and issue to the information processing machine provided at the upper-level item recovery point an instruction to transfer management of the collected good containing the lower-level item that was judged to be acceptable to the lower-level item regeneration point; and causing any one of the information processing machine provided at the upper-level item production point and the total management information processing machine to issue, when an item has a stock prediction that is less than a lower limit of a stock amount, a delivery instruction to an information processing machine which manages a production point of the item that has the stock prediction that is less than a lower limit of a stock amount.

\* \* \* \* \*